United States Patent [19]

Piccolruaz

[11] Patent Number: 4,760,397
[45] Date of Patent: Jul. 26, 1988

[54] TARGET TRACKING SYSTEM

[75] Inventor: Heinz Piccolruaz, Regensdorf, Switzerland

[73] Assignee: Contraves AG, Zürich, Switzerland

[21] Appl. No.: 134,751

[22] Filed: Dec. 18, 1987

[30] Foreign Application Priority Data

Dec. 22, 1986 [CH] Switzerland ................. 05216/86

[51] Int. Cl.$^4$ ............................ G01S 7/46; F41G 5/08
[52] U.S. Cl. ........................................ 342/75; 342/67;
89/41.07; 235/412
[58] Field of Search ................... 342/67, 75; 89/41.04,
89/41.07; 235/411, 412, 413; 364/516, 517

[56] References Cited

U.S. PATENT DOCUMENTS

| | | | |
|---|---|---|---|
| 3,307,180 | 2/1967 | Lind | 342/67 |
| 3,924,235 | 12/1975 | Heller et al. | 342/75 |
| 4,092,716 | 5/1978 | Berg et al. | 364/423 X |
| 4,179,696 | 12/1979 | Quesinberry et al. | 342/75 |
| 4,320,287 | 3/1982 | Rawicz | 235/412 |
| 4,637,002 | 1/1987 | Sallas | 367/190 |

FOREIGN PATENT DOCUMENTS

| | | |
|---|---|---|
| 0207521 | 1/1987 | European Pat. Off. . |
| 1165459 | 3/1964 | Fed. Rep. of Germany . |
| 3004633 | 8/1981 | Fed. Rep. of Germany . |
| 3303888 | 8/1984 | Fed. Rep. of Germany . |

OTHER PUBLICATIONS

International Patent Publication No. WO81/00149, published Jan. 22, 1981.
Publication by R. F. Berg Entitled "Estimation and Prediction for Manouvering Target Trajectories" in IEEE Transactions on Automatic Control, vol. AC-28, No. 3, pp. 294 to 304, Mar. 1983.

Primary Examiner—T. H. Tubbesing
Assistant Examiner—Gilberto Barron, Jr.
Attorney, Agent, or Firm—Werner W. Kleeman

[57] ABSTRACT

The target tracking system has high tracking reliability at small servo load and comprises a plural number of groups of target sensors having tracking signal travelling times which vary from one group to the other and defining respective lines of sight, a servo system causing the lines of sight to track the target, a target estimator for estimating the movement of the target, a servo estimator for estimating the movement of the servo system, and a regulator which identically controls the servo system and the servo estimator such that the vectorial difference between the estimate of the target movement and the estimate of the servo movement is caused to approach zero. During the target tracking operation, vectorial target deviation signals which are generated by groups of angle sensors, are processed by multipliers using respective matrices in order to produce related combined target deviation signals. The thus processed vectorial target deviation signals are directly applied to the servo system and the servo estimator in a manner as if there would be present only one respective angle sensor producing the combined target deviation signal.

14 Claims, 3 Drawing Sheets

TARGET TRACKING SYSTEM

BACKGROUND OF THE INVENTION

The present invention relates to a new and improved construction of a target tracking system.

In its more particular aspects the present invention specifically relates to a new and improved construction of a target tracking system containing at least one angle sensor for measuring the angular deviation of the target from at least one line of sight associated with at least one antenna of the at least one angle sensor. There are further provided at least one range sensor for measuring the range between the target and the at least one range sensor and a servo system for continuously laying the at least one antenna of the at least one angle sensor and the at least one range sensor towards the target such that the target is continually present within the transmitting range and the receiving range of the at least one angle sensor and the at least one range sensor.

Target tracking systems of the aforementioned type are primarily required for temporally and spatially measuring and extrapolating the flight paths or trajectories of civil or military flying objects, such as aircraft and missiles within the atmosphere. The tracked or measured objects, however, may also move in outer space, on the ground or on water and even under water.

Regarding non-military uses it is intended in most cases to prevent a collision of two objects, for example, commercial air planes. Regarding military applications, however, it is intended in most cases to bring about the collision of two objects like, for example, a projectile and a target.

For this purpose, the objects must be tracked and measured in the most precise and most reliable manner as possible because the extrapolation of a flight path or trajectory cannot be better than the tracking and measurement of such flight path for trajectory.

It is for this reason that frequently a plural number of sensors is utilized and such plural number of sensors define a common or at least overlapping measuring range for tracking and measuring a single object or target. It will be assumed for the description following hereinbelow that only one object or target is intended to be tracked by each target tracking system.

The operation of tracking implies that the sensors or their antennae are moved by means of a servo system such that the object or target to the greatest possible extent is continually present within the measuring range of the aforementioned sensors or their antenna. Only in this manner is it possible for the object or target and its flight path or trajectory to be measured sufficiently effectively and only in this manner is it possible for the object or target, in turn, to be tracked sufficiently effectively. Thus the tracking operation and the measuring operation are mutually dependent with respect to the quality of their results.

In most cases, the sensors transmit and receive electromagnetic waves having a wavelength in the range between $10^{-7}$ m and $10^{-1}$ m. However, acoustic waves are also utilized, particularly under water or in submarine applications. Acoustic waves propagate in air at a velocity which is smaller than the propagation velocity of electromagnetic waves by a factor of about 1 million or $10^6$.

The measuring ranges of the sensors are relatively narrow in most cases and define a center line which will be called "line of sight" further hereinbelow. Such lines of sight must not absolutely be straight. For example, the lines of sight can be curved when acoustic waves traverse layers of air having different air temperatures and/or different wind velocities.

The aforementioned range sensors generally measure the range or distance between such range sensor and an object or target on the basis of the travelling time of the employed waves from the range sensor to the object or target and back to the range sensor. For this reason, the range sensors must constitute active range sensors, i.e. sensors which themselves transmit the waves. The lines of sight associated with the waves transmitted by the transmitter and received by the receiver of such range sensor must be permitted to be moved independent of each other in the event that the object or target does not move much slower than the transmitted or received wave.

Contrary thereto, angle sensors measure the angular deviation of the object or target from the line of sight of the angle sensors which also may constitute passive sensors, i.e. receive waves which originate from external sources, for example, the sun or the object or target itself. The ratio of the wavelength of the waves and the size of the antenna receiving and possibly also transmitting the waves, greatly affects the narrowness of the measuring range or the laying action of the angular sensors and thus particularly the precision of such angle sensors. This laying action is also required in order to maintain small the energy requirements when active angle sensors are utilized. This implies specifically at greater wavelengths that relatively heavy antennas and their lines of sight must precisely track the object or target. The imprecision of such tracking operation is frequently also called "tracking error" and impairs the precision of the angle sensors which, in turn, increases the tracking error and so forth.

Thus, in order to precisely measure the object or target, and specifically the reflection center of the object or target and clearly differentiate or discriminate between adjacent objects or targets or the object or target and its mirror image, it is important that the target tracking signals produced by the sensors are processed and supplied to the servo system in a manner such that the servo system has the lines of sight of the sensors pass through the object or target as reliably and precisely as possible. It is particularly intended to maximize the probability that the object or target is continually located within the measuring range of the sensors. This implies that the precedingly obtained measuring values of the sensors control the servo system such that no future measuring value is lost due to tracking errors. During such operation there can also be accounted for and minimized the load on the servo system due to, for example, wear, heating and the like.

SUMMARY OF THE INVENTION

Therefore with the foregoing in mind it is a primary object of the present invention to provide a new and improved construction of a tracking system which is not afflicted with the aforementioned limitations and drawbacks of prior art constructions.

Another and more specific object of the present invention is directed to providing a new and improved construction of a target tracking system which has optimum efficiency at maximum reliability of the tracking operation and minimum servo load.

It is a further significant object of the present invention to provide a new and improved construction of a target tracking system which maximizes the probability of continually finding the tracked object or target within the relatively narrow measuring range of the tracking sensors.

Now in order to implement these and still further objects of the invention, which will become more readily apparent as the description proceeds, the tracking system of the present development is manifested by the features that, there is provided a servo estimator for estimating the state of movement of the servo system by means of a position or servo sensor signal, the servo estimator constituting a model of the servo system. A target estimator is provided for estimating the state of movement of the object or target based on the position sensor signal as well as the target sensor signals obtained from all of the at least one angle sensor and the at least one range sensor, the target estimator constituting a model of the movement of the object or target. The inventive tracking system further comprises a regulator for identically controlling the servo system and the servo estimator by means of a common control signal, the regulator constituting an inverse system as compared to the remaining portion of the inventive target tracking system. At least one multiplier is provided for transforming at minimum time delay the target deviation signals generated by the at least one angle sensor into common control signals for the servo system and the servo estimator. The common control signal defines a control vector constituted by a product of the multiplier matrix and the target deviation vector defined by the target deviation signals.

The range sensors and angle sensors having a straight line of sight measure the position of the object or target relative to a polar coordinate system which is fixed relative to such sensors. This polar coordinate system is made to track or follow the object or target with respect to its angular orientation by means of the servo system. The movement of the object or target as well as the movement of the servo system as viewed relative to an inertial coordinate system, obey the laws of Newtonian mechanics. Therefore, such movement can be described in a particularly simple manner with respect to an inertial coordinate system or inertial system.

This inertial or absolute movement of the object or target within the inertial system is composed of the movement of the object or target relative to the polar coordinate system which is fixed relative to the sensor and the movement of such polar coordinate system relative to the inertial system. The last one of the two aforementioned movements is measured, by means of position or servo sensors. Associated therewith are sensor servo encoders which generate an encoder signal which constitutes a portion of a position or servo sensor signal. Such position or servo sensor signal represents a measured signal or measurement at least of the positions of the rotational axes of the sensor servo relative to each other or relative to a predetermined platform. This type of measurement is sufficient in the event that the sensor servo is at rest on a platform which is only inertially moving.

Strictly speaking, such rest condition of the sensor servo on an only inertially moving platform is never realized. Frequently, the platform is mounted at a vehicle, for example, an air plane, a tank, a water surface craft or a submarine. Even considering our planet, the Earth does not only inertially move but rotates about its axis which interconnects the poles of the Earth. In the event that the non-inertial movements of the platform are significant, then, such movements must also be measured by means of the position or servo sensors, for example, by means of a so-called reference system. In terms of system theory, the assumption is recommended that the movement of the platform is generated by means of an imaginary platform servo which is controlled only by unknown random signals.

In contrast thereto, the actual sensor servo is directly or indirectly controlled by means of the target sensor signals and the position sensor signals. During such control operation, the sensor servo must mediate between the movements of the platform and the movements of the object or target such that the lines of sight of the sensors continually pass through the object or target.

Ultimately the platform servo and the sensor servo can be conceptually combined into a combination servo containing first motors which are operatively associated with "lower" rotational axes and second motors which are operatively associated with "upper" rotational axes. The first motors which are operatively associated with the "lower" rotational axes, are controlled by means of random signals and the motors which are operatively associated with the "upper" rotational axes are controlled by means of the sensor signals, whereas the position of all of the aforementioned rotational axes is measured by means of the position sensors. The position or servo sensor signals generated by the position or servo sensors, including the position sensor signals originating from the reference system, are assumed to be combined to form the vectorial position sensor signal. The signals originating from the angle sensors and the range sensors will be designated as target sensor signals. Thus, the position or servo sensor signals contribute to describing the state of movement of the servo system and such position or servo sensor signals not only comprise position-related signals but also velocity-related signals. The target sensor signals originating from the angle sensors and the range sensors and describing the state of movement of the object or target, generally are position-related signals.

In the following, the servo system S will be understood to constitute a combination of component servos $S_i$ each of which causes movement of a line of sight and constitutes a combination servo system within the meaning of the term in the preceding paragraph. Therein the platforms of the component servos $S_i$ may be identical, coupled to each other or totally independent of each other and also spatially widely distant from each other. In the latter case, there are not only required rotary position sensors but additionally translatory position sensors. On the other hand, the sensor carrier of one of the component servos $S_i$ also may serve as a platform for a different component servo $S_j$.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the construction of the target tracking system and related components have been illustrated therein as is needed to enable one skilled in the art to readily understand the underlying principles and concepts of the present invention.

Figure 1:
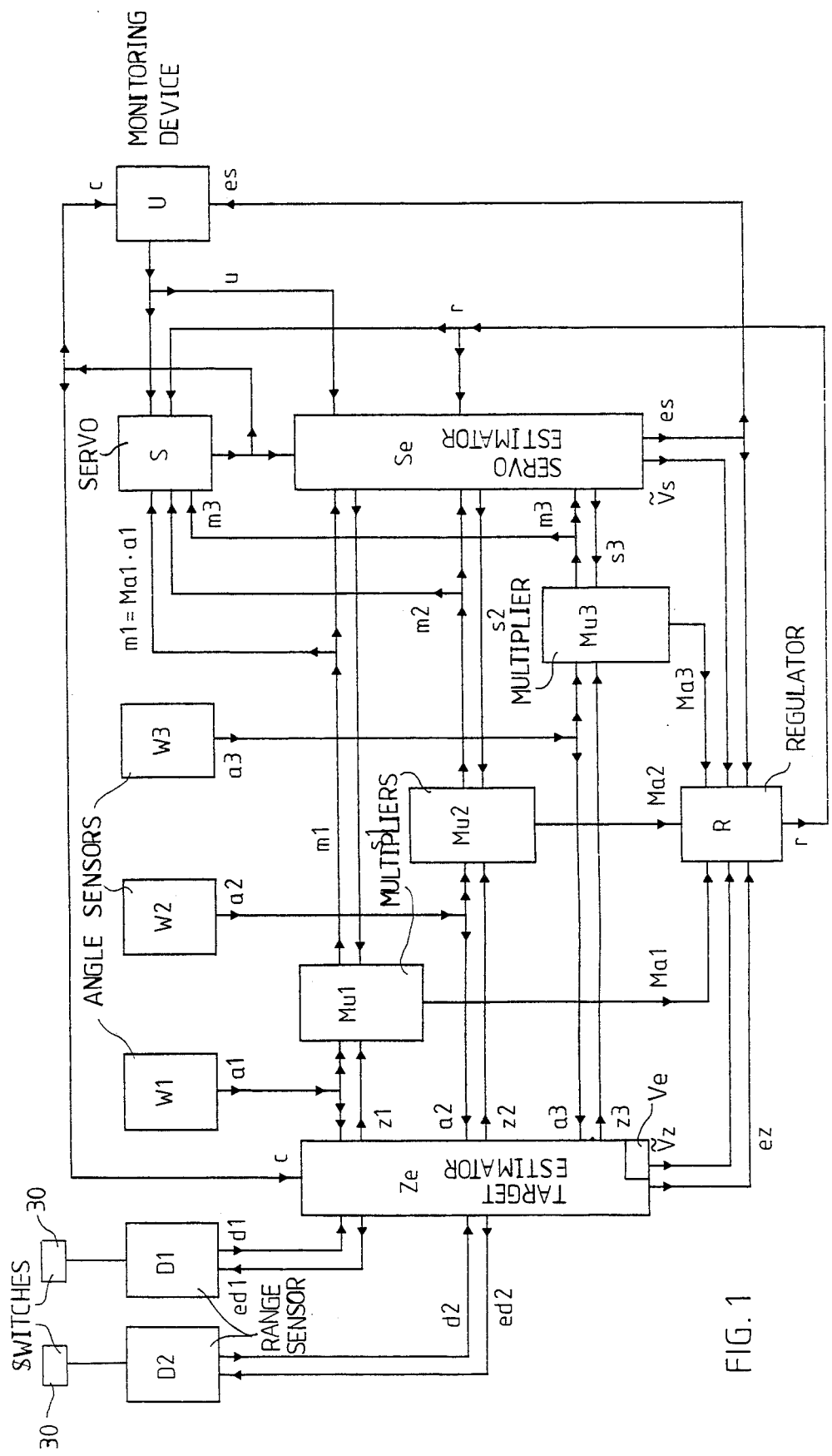
FIG. 1 is a schematic block circuit diagram of an exemplary embodiment of the inventive target tracking system.

Turning attention now specifically to FIG. 1 of the drawings, there has been illustrated therein by way of example and not limitation a schematic block circuit diagram of the inventive target tracking system containing, for example, two range sensors D1 and D2 which define respective lines of sight, as well as, for example, three angle sensors W1, W2 and W3 which define respective lines of sight. Operatively connected to the angle sensors W1, W2 and W3 for directly receiving respective target deviation signals a1, a2 and a3 is a target estimator Ze. Also operatively connected with the angle sensors W1, W2 and W3 are multipliers Mu1, Mu2 and Mu3 and thereby a servo system S and an associated servo estimator Se which likewise receive the target deviation signals a1, a2 and a3 in an indirect manner through the aforementioned multipliers Mu1, Mu2 and Mu3.

The target estimator Ze processes the target deviation signals a1, a2 and a3 conjointly with a position sensor signal c which is derived from the servo system S, and the measured ranges d1 and d2 which originate from the range sensors D1 and D2 and, as a result, there is obtained an estimate ez of the state of movement of the object or target.

The projections ed1 and ed2 of the estimate ez on the respective lines of sight associated with the respective range sensors D1 and D2 assist these range sensors or the respective electronic range servo systems in tracking the object or target with respect to its range. With respect to the angle, the object or target is tracked by means of the servo system S which supports all of the sensors, namely the angle sensors W1, W2 and W3 and the range sensors D1 and D2.

The servo system S is controlled by the object or target via the multipliers Mu1, Mu2 and Mu3 at a minimum time delay but in an imprecise manner as well as via the target estimator Ze and the regulator R at a relatively great time delay but in a precise manner. Exactly the same control signals m1, m2 and m3 which respectively originate from the multipliers Mu1, Mu2 and Mu3, and the control signal r which originates from the regulator R, are also received by the servo estimator Se. The servo estimator Se processes the aforementioned control signals m1, m2 and m3 and r together with the position sensor signal c to form an estimate es of the state of movement of the servo system S. The control signals m1, m2 and m3 represent positions whereas the control signal r also may represent velocities, accelerations and so forth.

The estimate ez which is generated by the target estimator Ze and the estimate es which is generated by the servo estimator Se, are processed inclusive of their respective estimate error variances $\widetilde{V}z$ and $\widetilde{V}s$ conjointly with matrices Ma1, Ma2 and Ma3 which are associated with the multipliers Mu1, Mu2 and Mu3, by the regulator R in order to produce the control signal or adjusting signal r. The matrices Ma1, Ma2 and Ma3 which are associated with the multipliers Mu1, Mu2 and Mu3, are adjusted from the target estimator Ze via respective signals z1, z2 and z3 as well as from the servo estimator Se via respective signals s1, s2 and s3.

A monitoring device U analogously directs the servo system S and the servo estimator Se to an object or target to be tracked by means of an instruction signal u and receives the position sensor signal c from the servo system S as well as the estimate es from the servo estimator Se.

Furthermore, the target estimator $Z_e$ contains a variance estimator Ve which will be explained in more detail further hereinbelow.

The inventive target tracking system contains as essential components the multipliers Mui, the target estimator Ze, the regulator R and the servo estimator Se. These components will be described in more detail in correspondingly entitled sections hereinbelow. All of the related errors and disturbances are supposed to be average-free errors and average-free disturbances. This precondition is conventionally satisfied by estimating and subtracting any average values which may occur.

THE MULTIPLIERS Mui

As already mentioned, each angle sensor or each angle sensor receiver Wi outfeeds a target deviation signal ai. Such target deviation signal ai constitutes a target deviation vector associated with at least two scalar components, for example, azimuth angle and elevation angle. Such target deviation signal or target deviation vector ai represents a measurement of the difference between a reference value and the actual value of the position of the at least two upper rotational axes of the respective component servo Si which is controlled by the sensor signals and which moves the line of sight of the angle sensor or angle sensor receiver Wi.

The number of rotational axes of such component servo Si does not have to be equal to the number of components of the target deviation signal or target deviation vector ai. Also, the motion of a single rotational axis in the event that the object or target is not moved, may cause more than one component of the target deviation signal or target deviation vector ai to vary.

It is for this reason that the target deviation signal or target deviation vector ai is not directly suitable as a control signal or control vector mi for the component servo Si and which control signal or control vector mi is intended to decrease the target deviation signal or target deviation vector ai to zero. Nevertheless, the control signal or control vector mi may be linearly dependent upon the target deviation signal or target deviation vector ai as long as the target deviation signal or target deviation vector ai remains sufficiently small. Such linear dependency or function is assumed to be represented by a temporally variable matrix Mai and to be realized by the controllable multiplier Mui. Such multiplier Mui is intended to operate, if possible, without time delay so that the target deviation signal or target deviation vector ai is reduced in the quickest, most reliable and most precise possible manner.

For this purpose, the multiplier Mui preferably is constructed of analog hardware, for example, a field of motor potentiometers each of which constitutes one element of the matrix Mai. The multiplier Mui also may be constructed of a digital one-purpose hardware, for example, a field of switches, in the event that the matrix elements can only assume a limited number of discrete values as mentioned hereinbelow with respect to a robust matrix in the section entitled "Robust Matrix". Such switches also may constitute simple connections or interruptions in the event that the respective matrix elements never change.

Thus the multiplier Mui does not have a memory, i.e. the multiplier output signals or control signals mi, at a given multiplier matrix Mai, only depend upon the instant input signal or target deviation signal or vector ai but not from previous values of such input signal.

However, the multiplier Mui condenses redundant measurements in the event that the target deviation signal or target deviation vector ai is associated with more than two scalar components, for example, because the angle sensor or angle sensor receiver Wi constitutes a combination of a plural number of receivers associated with a common line of sight. This may be the case, for example, when the plural number of receivers is a combination of video cameras, FLIR cameras, radar equipment etc. In such case the wavelength as well as the measuring directions transversely to the line of sight of such instruments can be totally different.

Furthermore, the multiplier Mui distributes the condensed measurements in a suitable manner over those rotational axes which are associated with the component servo Si and which are controlled by the sensor signals in the event that the number of these controllable rotational axes is greater than two.

TARGET ESTIMATOR Ze

In contrast to the multiplier Mui, the target estimator Ze possesses a memory and utilizes such memory in order to produce an estimate ez of the state of movement of the object or target with respect to all of its state variables in a suitable coordinate system. The estimate ez is obtained from the position sensor signals c associated with all lines of sight, all of the target deviation signals or vectors ai which are indicative of the deviations of the object or target from the different lines of sight, and all of the measured ranges di. If the coordinate systems are identical, the estimate ez represents the actual state of movement of the object or target, at least with respect to the angles, and thus also the intended state of movement of the line of sight associated with those component servos Si which, in turn, are associated with those sensors transmitting and receiving signals at a negligibly small travel time. The intended state of movement of the remaining component servos Si is derived from the estimate ez by temporally positive or negative extrapolation. From hereon the estimates ez of the state of movement of the object or target will be considered to also include such temporal extrapolations.

The estimate ez of the state of movement of the object or target as obtained by means of the target estimator Ze is afflicted with an estimate error $\widetilde{ez}$ which has a predetermined variance $\widetilde{V}z$. In order to minimize such variance $\widetilde{V}z$, the target estimator Ze is preferably realized in the form of an Extended Kalman-Bucy-Filter. Different uses of such Extended Kalman-Bucy-Filter are described, for example, in U.S. Pat. No. 4,320,287, granted Mar. 16, 1982, and in the publication by R. N. Kenefic et al in IEEE Transactions on Aerospace and Electronic Systems, Volume AES-17, No. 4, pages 482 to 489, July 1981. Such Extended Kalman-Bucy-Filter also readily computes triangulations when utilizing mutually widely distant angle sensors which thus may supplement or substitute active range sensors.

REGULATOR R

In the case of an ideal servo system S, the actual state of movement ês of such servo system S would be without any time delay and exactly equal to its intended state of movement as given by the estimate ez of the state of movement of the object or target. For this purpose the servo system S, among other things, would have to be infinitely broad-banded. In reality, the servo system S oscillates in the event that its limit frequency has a higher value than the resonant frequencies of its structure. Therefore, the limiting frequency has a lower value and preferably is approximately equal to the limit frequency of its useful or input signal, i.e. the estimate ez generated by the target estimator Ze and indicative of the state of movement of the object or target. As a compensation and as illustrated in FIG. 1, the regulator R operatively precedes the servo system S and the servo estimator Se.

Assuming all elements of all of the matrices Mai of all multipliers Mui to be zero, then, the servo system S and the servo estimator Se would be affected by the movement of the object or target not directly via the control signals mi which represent differences between the intended signals and the actual signals, but only indirectly via the regulator signal r. In such case the regulator R would have to be equal to a system inverse in relation to the servo system S in order that their series-connection acts like an ideal servo system.

Figure 2A:
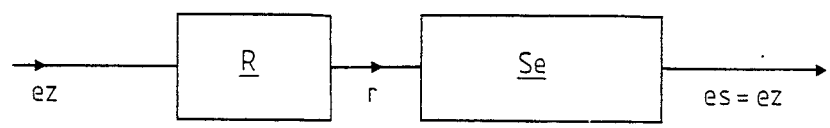
FIG. 2a is a schematic block circuit diagram of a first regulator configuration in the inventive target tracking system illustrated in FIG. 1.

However, the servo system S cannot be precisely inverted because its behavior or the differential equations describing its behavior are not precisely known. Therefore, and as illustrated in FIG. 2a, the regulator R is not the exact inverse of the servo system S but is only inverse to that portion of the servo estimator Se which portion represents a model of the servo system S. Such model reproduces or models substantially the limitations of band width of the servo system S. These limitations of band width are compensated by the regulator R such that the servo estimator output signal, i.e. the estimate es of the state of movement of the servo system S becomes equal to the regulator input signal, i.e. the estimate ez of the state of movement of the object or target. The regulator output signal, i.e. the control signal r outfed by the regulator R, then, is equal to the input of the servo estimator Se which means that the regulator R is the inverse of the (model of the servo system S in the) servo estimator Se. Thus the regulator R is also inverse relative to the servo system S within the degree of precision of the aforementioned model. Imprecisions of such model are continuously reduced by the servo estimator Se. This is due to the fact that the servo estimator Se continuously observes, on the basis of the position sensor signal c, the behavior of the servo system S in reality.

In the regulator configuration illustrated in FIG. 2a, the servo estimator output signal, i.e. the estimate es which is indicative of the state of movement of the servo system S, is not fed back to the regulator R. This is not even required when the servo estimator Se is precisely inverted by the regulator R and the servo estimator Se is stable which implies that the impulse response of the servo estimator Se decays. However, for a precise inversion of the servo estimator Se the regulator R requires a model of the servo estimator Se and thus a model of the model of the servo system S. Due to the fact that it would constitute an idle operation to operate the model of a model, and in order that there may be reduced the consequences of the imprecisions of the model by the regulator R, as shown in FIG. 1, the servo estimator Se feeds back to the regulator R the estimate es of the complete state of movement of the servo system S.

Figure 2B:
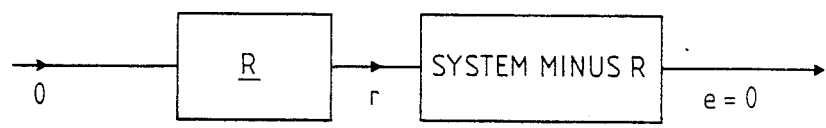
FIG. 2b is a schematic block circuit diagram of a second regulator configuration in the inventive target tracking system illustrated in FIG. 1.

There is thus opened up another possibility of considering the function of the regulator R and such other possibility is illustrated in FIG. 2b. In this particular configuration, the regulator R no longer equalizes the estimate es of the state of movement of the servo system S and the estimate ez of the state of movement of the object or target in the event that both estimates es and ez are associated with the same coordinate system, but equalizes to zero an apparent tracking error e as a position component of the difference ez−es between the estimate ez and the estimate es and which difference constitutes the difference between an intended or reference value ez and an actual value es. Thus, in this manner of considering the inversion problem, the input signal to the regulator R is not equal to the estimate ez of the state of movement of the object or target, but zero and the regulator R no longer constitutes the inverse of the servo estimator Se but rather the inverse of the entire residuum of the target tracking system inclusive of the platform movement and the target movement.

In such new and more comprehensive concept there can also be omitted the precondition that all of the elements of all of the matrices Mai of all of the multipliers Mui should be equal to zero. Instead, the foreseeable future of the state of movement of the object or target or the estimate ez of the state of movement of the object or target as produced by the target estimator Ze is accounted for by the regulator R. In such configuration, the regulator R receives as input signals the estimates ez and es and such estimates save the regulator from forming the corresponding model. However, the regulator R needs the matrices Mai in order to correctly reproduce the direct coupling of the controllable rotational axes of the servo system S and the servo estimator Se to the movement of the object or target. Preferably, the regulator R operates on the assumption that the instant values of the matrices Mai will also be valid in the future.

It should be noted that the regulator R does not equalize to zero the true tracking error ê which is unknown, but only the error-afflicted estimate e of the true tracking error which, therefore, is called "apparent tracking error".

SERVO ESTIMATOR Se

The position sensor signal vector c constitutes only an incomplete and error-afflicted measurement of the true state of movement ês of the servo system S. Therefore, the servo estimator Se must produce the estimate es of the state of movement of the servo system S on the basis of the position sensor signal vector c as well as the control signals which act upon the servo system S, namely the control signals mi which are produced by the multipliers Mui, and the control signals r which are produced by the regulator R. The servo estimator Se preferably also constitutes an Extended Kalman-Bucy-Filter which substantially represents a model of the servo system S. This model produces an estimate of the position sensor signal vector c and compares such estimate to the actually measured position sensor signal vector c. Any deviation, if present, is called a residuum and serves the purpose of adapting the state of movement of the model represented by the servo estimator Se to the estimate es of the state of movement of the original servo system S. By means of adaptive additions to the Kalman-Bucy-Filter, also the model as such may be adapted to the original servo system S.

In the following, there will now be described the operational inter-relationship between the different components of the aforedescribed inventive target tracking system.

MULTIPLIER MATRICES Mai

In this section there will only be considered the i-th line of sight.

VARIANCE-OPTIMIZED MATRIX

A target deviation signal or vector âi is defined as the deviation of the target from the line of sight as measured by an angle sensor or angle sensor receiver Wi in the event that such angle sensor or angle sensor receiver Wi does not produce a measuring error. Such error-free target deviation vector âi obeys the following equation:

$$\tilde{a}i = ai - \hat{a}i \tag{1}$$

Therein, $\tilde{a}i$ represents the measuring error, ai the measured target deviation signal or vector and âi the error-free target deviation vector measured by an error-free angle sensor.

Furthermore, â=ê wherein â is the true target deviation from the aforementioned i-th line of sight and ê represents the true tracking error. This true target deviation â would be generated by an error-free angle sensor or angle sensor receiver W which measures in precisely two different directions transverse to the line of sight, for example, the azimuth angle and the elevation angle and thus produces no redundant measurements.

In the event that the error-free target deviation vectors âi and â are sufficiently small, their dependency is sufficiently linear and can be represented by the rectangular and full-rank measuring matrix H as given in equation (2):

$$\hat{a}i = H.\hat{a} \tag{2}$$

The measuring matrix H is a rectangular matrix of dimensions 2.imax where imax is the (maximum) number of scalar sensors involved.

In the reverse case, the following relationship holds:

$$\hat{a} = H^S.\hat{a}i = (H'.H)^{-1}.H'.ai \tag{3}$$

The Moore-Penrose Pseudoinverse, see, for example, G. H. Golub, C. F. van Loan, Matrix Computations; North Oxford Academic, page 139, 1983:

$$H^S = (H'.H)^{-1}.H' \tag{4}$$

guarantees that the square $(\bar{a} - H^S.\bar{a}i)'.(\bar{a} - H^S.\bar{a}i)$ of the magnitude $|\bar{a} - H^S.\bar{a}i|$ of the vector $\bar{a} - H^S.\bar{a}i$ does not necessarily become zero as in the case of the vector $\hat{a} - H^S.\hat{a}i$, but still is at least minimized. In these equations $\bar{a}$ is defined as an estimate of the true target deviation $\hat{a}i$.

Therein, $$\bar{a}i = J.ai \tag{5}$$

represents an estimate of the error-free target deviation vector $\hat{a}i$ and which estimate has an estimate error:

$$\overset{\circ}{a}i = \bar{a}i - \hat{a}i = J.ai - \hat{a}i \tag{6}$$

In equation (6) the estimate error should not correlate with the target deviation estimate $\bar{a}i$ and therefore possesses minimum variance. If the estimate error would correlate with the target deviation estimate $\bar{a}i$, such correlation could be used for reducing the variance in the estimate error $\overset{\circ}{a}i$.

Post-multiplication of the two sides of equation (6) by $\hat{a}i'$ and formation of the expected value results, in accordance with equation (1), in:

$$\begin{aligned}E(\overset{\circ}{a}i \cdot ai') &= E[J \cdot ai \cdot ai' - ai \cdot ai'] \\ &= E[J \cdot ai \cdot ai' - \hat{a}i \cdot \hat{a}i' - \overset{\sim}{a}i \cdot \overset{\sim}{a}i']\end{aligned} \tag{7}$$

The expectancy operator E constitutes the integral of its argument over the ensemble; see, for example, V. Fabian, J. Hannan; Introduction to Probability and Mathematical Statistics, John Wiley & Sons, 1985, Page 18.

Thus the following consideration holds:

When the measuring error $\tilde{a}i$ does not correlate with the error-free target deviation vector $\hat{a}i$ and thus possesses minimum variance, the estimate error $\overset{\circ}{a}i$ does not correlate with the measured value $ai$ and thus also not with the target deviation estimate $\bar{a}i$ and thus also possesses minimum variance, provided that the target deviation estimate $\bar{a}i$ is computed in accordance with the relationship:

$$\bar{a}i = J.ai = \hat{V}ai.Vai^{-1}.ai = (Vai - \tilde{V}ai).Vai^{-1}.ai \tag{8}$$

Therein the characters have the meaning already explained hereinbefore; Vai represents the variance in the measured value $\hat{a}i$, represents the variance in the error-free target deviation vector $\hat{a}i$ and $\tilde{V}ai$ represents the variance in the measuring error $\tilde{a}i$. The determination of the variances Vai, $\hat{V}ai$ and $\tilde{V}ai$ using the redundancy of the aformentioned sensor signals a, d and c will be described further hereinbelow in the section entitled "Variance $\tilde{V}$ of the Target Deviation Error".

The estimate matrix J disappears in the event that the variance $\tilde{V}ai$ in the measuring error $\tilde{a}i$ of the error-free target deviation $\hat{a}i$ becomes equal to the variance Vai of the measured target deviation signal or vector ai because in such case the target deviation signal or vector ai only comprises noise as represented by the measuring error $\tilde{a}i$. Conversely, the estimate matrix J is transformed into the identity matrix when the noise represented by the measuring error $\tilde{a}i$ disappears.

The redundant measurements of the target deviation signal or vector ai thus can be condensed to the following estimate of minimum variance:

$$\bar{a} = H^S.\bar{a}i = H^S.J.ai = (H'.H)^{-1}.H'.(Vai - \tilde{V}ai).Vai^{-1}.ai \tag{9}$$

This estimate of minimum variance is an estimate of the true and redundance-free target deviation $\hat{a}$ which just has to be distributed over the controllable rotational axes of the component servo Si.

Therefore, it may be assumed that:

$$\hat{a} = L.\hat{e}i = \hat{e} \tag{10}$$

Therein $\hat{a}$ is the true and redundance-free target deviation and $\hat{e}$ the true tracking error. The matrix L is a rectangular matrix of dimensions 2.imax wherein imax is the maximum number of controllable rotational axes involved.

The true tracking error vector $\hat{e}i$ is assumed to have as many components as the component servo Si has controllable rotational axes and also may represent a possible combination of true positional errors of such rotational axes. Such combination would cause the true target deviation vector $\hat{a}$. It is assumed that such true tracking error vectors or positional errors $\hat{e}i$ are sufficiently small. By utilizing the relationship:

$$\hat{e}i = L^S.\hat{a} = L'.(L.L')^{-1}.\hat{a} \tag{11}$$

there is preferably selected that combination of true tracking error vectors or positional errors which minimize the square $\hat{e}i'.\hat{e}i$ of the magnitude $|\hat{e}i|$ of the true tracking error vector $\hat{e}i$, provided that no other requirement is made with respect to the positions of the rotational axes. Otherwise, the Moore-Penrose Pseudoinverse $$L^S = L'.(L.L')^{-1} \tag{12}$$

of the full-rank matrix L may be replaced with a different pseudoinverse which also fulfills the condition $$L.L^S.L = L, \tag{13}$$

for example, by:

$$L^S = L'.(L.L')^{-1} + L'.(L.L')^{-1}.L.Y - Y \tag{14}$$

Therein the otherwise arbitrarily selectable matrix Y satisfies the aforementioned requirements which, for example, can arise if, for preventing mirror or reflection effects, the rotational position of a radar antenna relative to a plane of reflection is prescribed or if it is required to avoid singularities or limiting stops of the controllable rotational axes of the component servo Si.

The aforementioned mirror or reflection effects arise when radar radiation is reflected at surfaces like, for example, a relatively calm sea surface. The reflected radar radiation interferes with the directly transmitted and target reflected radar radiation and causes problems in the signal evaluation.

When the component servo Si is positionally controlled, it will be sufficient to infeed thereto as the control signal mi the position error estimate:

$$mi = ei = L^S.\bar{a} = L^S.H^S.J.ai \tag{15}$$

to achieve that the component servo Si reduces the measured target deviation signal or vector ai. Thus the matrix Mai of the multiplier Mui can be computed at optimum variance for Y=0 as $$Mai = L^S \cdot H^S \cdot J \qquad (16)$$
$$= L' \cdot (H' \cdot H \cdot L \cdot L')^{-1} \cdot H' \cdot (Vai - \overline{V}ai) \cdot Vai^{-1}$$

ROBUST MATRIX

The estimate of the variances Vai and $\overline{V}$ai of the measured target deviation signal vector ai and its measuring error as described further hereinbelow requires a certain observation period. Unexpected variations in the variances Vai and $\overline{V}$ai during the observation period falsify the estimate and cause the matrix Mai from equation (16) to be less than optimum, particularly in the case of sudden sensor disturbances such as caused, for example, by the mirror or reflection effect. The robust multiplier matrix is intended to minimize the detrimental effect of such sensor disturbances on the quality of the tracking operation.

For the following consideration it is assumed that the elements of the matrix Mai of optimum variance in accordance with equation (16) can only assume two different values in the event that the variance of the measuring error $\overline{a}$i of the measured target deviation signal vector ai becomes equal to zero. One of these two different values is zero and this means that the corresponding element does not mediate a coupling between the respective rotational axis and the associated component of the target deviation signal vector ai. The value of those elements which mediate such coupling is the reciprocal to the number of the components of the target deviation vector ai per line of the matrix Mai or per rotational axis of the component servo Si.

The basic idea of the robust matrix starts from a known target tracking system according to Swiss Pat. No. 415,135, granted June 15, 1966. Therein, there is described a target tracking system having one line of sight (i=1), a bi-axial component servo Si=S1 and an angle sensor receiver Wi=W1 composed of two radar receivers which receive different wavelengths and each of which measures the target deviations in terms of azimuth angle and elevation angle. Thus in the known system the target deviation signal or vector ai=a1 comprises four components which may be defined as follows:

a11: first component of a1 representing the azimuth angle measured by the first radar receiver;
a12: second component of a1 representing the elevation angle measured by the first radar receiver;
a13: third component of a1 representing the azimuth angle measured by the second radar receiver; and
a14: fourth component of a1 representing the elevation angle measured by the second radar receiver.

The two components of the true target deviation vector â and the true tracking error vector ê=êi=ê1 may be defined as follows:

First component representing the azimuth angle; and
Second component representing the elevation angle.
On this basis there are obtained the following equations:

$$L = I = \begin{bmatrix} 1 & 0 \\ 0 & 1 \end{bmatrix} \text{ and } H = \begin{bmatrix} I \\ I \end{bmatrix} \qquad (21)$$

$$H' \cdot H = 2 \cdot I \text{ and } (H' \cdot H \cdot L \cdot L')^{-1} = \tfrac{1}{2} \cdot I \qquad (22)$$

$$L' \cdot (H' \cdot H \cdot L \cdot L')^{-1} \cdot H' = \tfrac{1}{2} \cdot [I, I] \qquad (23)$$

If the two radar receivers would operate in an error-free manner, the error variance $\overline{V}$ai=Va1 would disappear and the multiplier matrix Mai=Ma1, according to equation (16), would then become $$Ma1 = \begin{bmatrix} \tfrac{1}{2} & 0 & \tfrac{1}{2} & 0 \\ 0 & \tfrac{1}{2} & 0 & \tfrac{1}{2} \end{bmatrix} \begin{matrix} \text{Azimuth angle} \\ \text{Elevation angle} \end{matrix} \qquad (24)$$

First Radar   Second Radar

According to Swiss Pat. No. 415,135, however, all of the elements of the matrix Ma1 are equal to zero with the exception of one element per line which is equal to 1 and corresponds to the receiver having the absolutely smallest target deviation signal component for the respective line or rotational axis.

Such method operates sufficiently effectively as long as all receivers view the target. However, if one of the receivers does not receive a sufficiently strong signal or echo from the target and therefore generates a negligible target deviation signal, which is conventional for such apparatus, it is just this zero signal which becomes the control signal for the servo system and, as a result, the servo system will lose the target.

Such tracking loss or interruption, however, can be avoided because a blind receiver will simultaneously outfeed zero signals in all of its target deviation signal components. An observing or tracking receiver, however, will do so only during exact tracking and even then only at low probability. It is for this reason that, in accordance with the invention, during the search for the absolutely smallest signals there will be considered only those receivers which do not exclusively outfeed zero signals. If in an exceptional case an observing or tracking receiver is excluded due to such operation, such rare misfortune maximally can persist only until the tracking deteriorates because, then, an observing or tracking receiver no longer outfeeds zero signals. If all receivers are blind or have been erroneously excluded, the target will be tracked by the memo operation described further hereinbelow in the section entitled "Residues and Memo".

In the foregoing context a signal is considered a zero signal when this signal is absolutely substantially smaller than the residual noise on the respective line; and two receivers are considered different when receiving target signals or echoes of different wavelengths.

Figure 3:
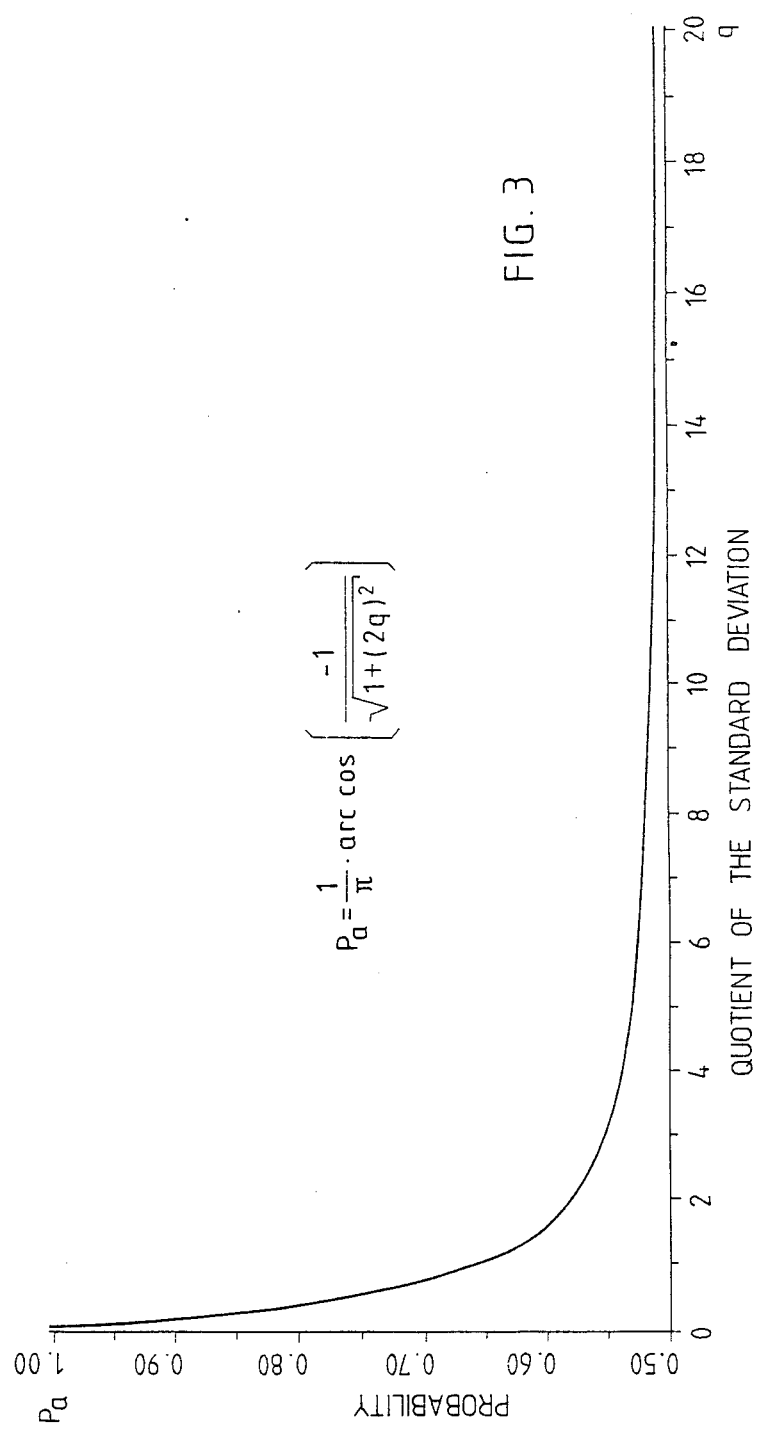
FIG. 3 is a graph showing on the ordinate or vertical axis the probability Pa of the absolutely smaller one of two target deviation signal components constituting the absolutely more precise target deviation signal component as a function of the quality q of the sensors and which quality q is plotted along the horizontal axis or abscissa.

The aforementioned robust matrix protects the tracking quality from strong sensor disturbances without time delay because such disturbances will not generate absolutely small target deviation signals but absolutely large target deviation signals with high probability. For further illustration reference is made to FIG. 3. In the graph of FIG. 3 there is represented the probability $$Pa = \arccos[-(1+4 \cdot q^2)^{-\tfrac{1}{2}}]/\pi \qquad (25)$$

for the absolutely smaller one of the two target deviation signal components a12 and a14 of the elevation angle according to Swiss Pat. No. 415,135, to also constitute the absolute more precise component. This means that the respective error $\tilde{a}12$ or $\tilde{a}14$ is absolutely smaller. For this consideration it is a precondition that $\hat{a}12 = \hat{a}14$ is equal to the true or error-free deviation of the target from the line of sight in respect of the elevation angle, that all of the aforementioned signals are free of average values and have a Gaussian distribution and that $$q^2 = \frac{E[\hat{a}12^2]}{E[\hat{a}12^2 + \tilde{a}14^2]} = \frac{E[\hat{a}14^2]}{E[\hat{a}12^2 + \tilde{a}14^2]} \qquad (26)$$

as well as:

$$E[\tilde{a}12 \cdot \tilde{a}14] = 0. \qquad (27)$$

In these relationships, E is the expectancy operator and E[x.x] is the second moment of the random variable x about the origin of x. Since in the present case the mean of x is zero, E[x.x] also represents the variance of x which by definition is the second moment of x about the mean. The standard deviation by definition is the square root of the variance. Consequently q in equation (26) is the quotient of two standard deviations and this quotient has been plotted on the abscissa in the graph of FIG. 3. In the present instance, q is a measure of the quality of the sensors.

The utilization of the robust matrix is recommended when a number of sensors can very rapidly deteriorate to a large extent, for example, due to the mirror or reflection effect.

SENSOR DATA CORRELATION

In the foregoing section the variances $V_{ai}$ and $\tilde{V}_{ai}$ of the target deviation signal vector ai and the target deviation error vector $\tilde{a}i$ were utilized. The following discussion is intended to explain the determination of such variances.

VARIANCE $\tilde{V}_{ai}$ OF THE TARGET DEVIATION ERROR $\hat{a}i$

In Equation (2) the measuring matrix H constitutes a rectangular matrix if the redundant error-free target deviation vector $\hat{a}i$ is composed of more components than the non-redundant error-free target deviation vector $\hat{a}$. Consequently, a linear dependency exists between the components of the vector $\hat{a}i$. This dependency may be represented by the rectangular and full-rank matrix G as in equation (31):

$$G.\hat{a}i = 0 \qquad (31)$$

Equation (2) may be pre-multiplied by the matrix G which results in:

$$G.\hat{a}i = G.H.\hat{a} = 0 \qquad (32)$$

Since the equations in (31) and (32) must be valid for any arbitrarily selected vectors $\hat{a}i$ or $\hat{a}$, there follows the relationship:
p
$$G.H = 0 \qquad (33)$$

The following considerations are based on the assumption that the matrix G constitutes a full-rank matrix and satisfies equation (33) but otherwise is of arbitrary structure. For example, for the target tracking system according to Swiss Pat. No. 415,135 referred to hereinbefore in the section entitled "Robust Matrix", a suitable matrix G would be:

$$G = \begin{bmatrix} 1 & 0 & -1 & 0 \\ 0 & 1 & 0 & -1 \end{bmatrix} \qquad (34)$$

If the target deviation signal vector ai has ni components, the matrix G has ni columns and ni−2 rows. When both sides of equation (31) are post-multiplied by $\hat{a}i'$ and the expected value is formed, there is obtained the relationship:

$$E[G.\hat{a}i.\hat{a}i'] = G.E[\hat{a}i.\hat{a}i'] = G.\hat{V}_{ai} = 0 \qquad (35)$$

When the measuring error $\tilde{a}i$ of the target deviation signal vector ai has minimum variance, i.e. does not correlate with the error-free value or target deviation vector $\hat{a}i$ and if ai, $\hat{a}i$ and are free of average values, the following relationship is valid between their variances $V_{ai}$, $\hat{V}_{ai}$ and $\tilde{V}_{ai}$:

$$\begin{aligned} V_{ai} &= E[ai \cdot ai'] = E[(\hat{a}i + \tilde{a}i) \cdot (\hat{a}i + \tilde{a}i)'] \\ &= E[\hat{a}i \cdot \hat{a}i' + \tilde{a}i \cdot \tilde{a}i' + \hat{a}i \cdot \tilde{a}i' + \tilde{a}i \cdot \hat{a}i'] \\ &= E[\hat{a}i \cdot \hat{a}i'] + E[\tilde{a}i \cdot \tilde{a}i'] = \hat{V}_{ai} + \tilde{V}_{ai} \end{aligned} \qquad (36)$$

Thus equation (35) becomes:

$$G.(\tilde{V}_{ai}=0 \qquad (37)$$

In accordance with Equation (8) there follows from Equation (37) that the estimate value $\hat{a}i$ of the error-free target deviation vector $\hat{a}i$ as well as the error-free target deviation vector $\hat{a}i$ itself obey the Equation (31) and, therefore, theoretically any pseudoinverse of H can be utilized for $H^s$ in Equation (9) or (16). Nevertheless, the Moore-Penrose-Pseudoinverse $(H'.H)^{-1}.H'$ of H has the advantage that thereby the sum of squares of errors is minimized which might be caused by any numerical imprecisions which might occur.

The target deviation variance $V_{ai}$ will be computed from the target deviation signal vector ai as described in the next-following section. Regarding the variance $\tilde{V}_{ai}$ of the error $\tilde{a}i$ of the target deviation signal vector ai it is first known that such variance is symmetric. Of its $ni^2$ elements, therefore, $ni.(ni+1)/2$ are unknown at first. However, all of these elements with the exception of $3.ni/2$ elements become zero if the assumption may be made that only two components of each target deviation signal vector ai of the same wavelength of the target echo have been measured and that only such pairs of components have correlated errors. If such correlations also vanish, for example, due to a spherically symmetric target, then, there remain as unknowns only the ni diagonal elements of the variance $\tilde{V}_{ai}$ On the other hand, the matrix Equation (37) contains (ni−2).ni scalar equations for the aforementioned unknowns, however, not all of such equations are always independent of each other. Nevertheless, there can be assumed as a rule of thumb that the number of unknowns linearly increases with increasing ni, however, the number of equations increases quadratically with increasing ni. Therefore, for $ni \geq 4$, there can be generally selected as unknowns, in addition to the unknown elements of the target deviation error variance $\tilde{V}_{ai}$, still further suitable elements of suitable matrices G, preferably relative response slopes of target sensors, and determined by sensor data correlation.

For example, the element $G22=1$ of the matrix G in Equation (34) for the target tracking system according to the aforementioned Swiss Pat. No. 415,135, can be replaced with the relative response slope $k\lambda$ with respect to the elevation angle because such response slope $k\lambda$ is particularly strongly subject to distortion by the aforementioned mirror or reflection effects. In the computing scheme as given on the following page there will be found at the bottom left-hand side such a matrix G and at the bottom right-hand side a null-matrix N. On the top right-hand side there is presented the matrix $\hat{V}ai = Vai - \tilde{V}ai$. Therein it is assumed that correlated error only appear for those component pairs of the target deviation signal vector $\tilde{a}i$ which component pairs are associated with the same radar receiver or the same wavelength of the target echo.

$$\begin{array}{cccc} Vai11 - \tilde{V}ai11 & Vai12 - \tilde{V}ai12 & Vai13 & Vai14 \\ Vai12 - \tilde{V}ai12 & Vai22 - \tilde{V}ai22 & Vai23 & Vai24 \\ Vai13 & Vai23 & Vai33 - \tilde{V}ai33 & Vai34 - \tilde{V}ai34 \\ Vai14 & Vai24 & Vai34 - \tilde{V}ai34 & Vai44 - \tilde{V}ai44 \\ \end{array}$$

$$\begin{array}{cccccccc} 1 & 0 & -1 & 0 & N11 & N12 & N13 & N14 \\ 0 & k\lambda & 0 & -1 & N21 & N22 & N23 & N24 \\ \end{array}$$

A scalar equation corresponds to each one of the eight elements of the null matrix N. Only seven scalar unknowns can be computed on the basis of such equations because the equations N12, N21, N14 and N23 are dependent from each other:

$$N11 = 0 = Vai11 - \tilde{V}ai11 - Vai13 \rightarrow \tilde{V}ai11 = Vai11 - Vai13 \quad (38)$$

$$N12 = 0 = Vai12 - \tilde{V}ai12 - Vai23 \rightarrow \tilde{V}ai12 = Vai12 - Vai23$$

$$N13 = 0 = Vai13 - Vai33 + \tilde{V}ai33 \rightarrow \tilde{V}ai33 = Vai33 - Vai13$$

$$N14 = 0 = Vai14 - Vai34 + \tilde{V}ai34 \rightarrow \tilde{V}ai34 = Vai34 - Vai14$$

$$N21 = 0 = k\lambda \cdot (Vai12 - \tilde{V}ai12) - Vai14 \rightarrow \tilde{V}ai12 = Vai12 - Vai14/k\lambda$$

$$N22 = 0 = k\lambda \cdot (Vai22 - \tilde{V}ai22) - Vai24 \rightarrow \tilde{V}ai22 = Vai22 - Vai24 \cdot Vai23/Vai14$$

$$N23 = 0 = k\lambda \cdot Vai23 - Vai34 + \tilde{V}ai34 \rightarrow \tilde{V}ai34 = Vai34 - Vai23 \cdot k\lambda$$

$$N24 = 0 = k\lambda \cdot Vai24 - Vai44 + \tilde{V}ai44 \rightarrow \tilde{V}ai44 = Vai44 - Vai24 \cdot Vai14/Vai23$$

The relative response slope $k\lambda$ follows from the results $\tilde{V}ai12$ and $\tilde{V}ai34$ which are obtained from equations N12 and N21 as well as N14 and N23 in conformity as:

$$k\lambda = Vai14/Vai23 \quad (39)$$

This shows that the Equation (38) could be solved easily (although it became quadratic by the introduction of the response slope $k\lambda$) thanks to the fact that many of the elements of the error variance Vai are zero.

Instead of the hitherto assumed two wavelengths and receivers, the following computing scheme is based on three wavelengths and receivers:

$$\begin{array}{cccccc} 11-\tilde{11} & 12-\tilde{12} & 13 & 14 & 15 & 16 \\ 12-\tilde{12} & 22-\tilde{22} & 23 & 24 & 25 & 26 \\ 13 & 23 & 33-\tilde{33} & 34-\tilde{34} & 35 & 36 \\ 14 & 24 & 34-\tilde{34} & 44-\tilde{44} & 45 & 46 \\ 15 & 25 & 35 & 45 & 55-\tilde{55} & 56-\tilde{56} \\ 16 & 26 & 36 & 46 & 56-\tilde{56} & 66-\tilde{66} \\ \end{array} \quad (40)$$

$$\begin{array}{cccccc} k\alpha & 0 & -1 & 0 & 0 & 0 \\ 0 & k\lambda & 0 & -1 & 0 & 0 \\ 0 & 0 & l\alpha & 0 & -1 & 0 \\ 0 & 0 & 0 & l\lambda & 0 & -1 \\ \end{array} \quad \begin{array}{cccccc} N11 & N12 & N13 & N14 & N15 & N16 \\ N21 & N22 & N23 & N24 & N25 & N26 \\ N31 & N32 & N33 & N34 & N35 & N36 \\ N41 & N42 & N43 & N44 & N45 & N46 \\ \end{array}$$

Therein the elements of the matrix $Vai - \tilde{V}ai$ are only designated by their indices for reasons of space. The indices 1 and 2 correspond to the first wavelength, the indices 3 and 4 to the second wavelength and the indices 5 and 6 to the third wavelength, each time with regard to the azimuth angle $\alpha$ and the elevation angle $\lambda$. The matrix G contains as four unknowns the relative response slopes k for the receivers 1 and 2 and the relative response slope l for the receivers 2 and 3. There thus result the following twenty-four equations for thirteen unknowns:

$$N11 = 0 = k\alpha \cdot (Vai11 - \tilde{V}ai11) - Vai13 \rightarrow \tilde{V}ai11 = Vai11 - Vai13/k\alpha$$

$$N12 = 0 = k\alpha \cdot (Vai12 - \tilde{V}ai12) - Vai23 \rightarrow \tilde{V}ai12 = Vai12 - Vai23/k\alpha$$

$$N13 = 0 = k\alpha \cdot Vai13 - Vai33 + \tilde{V}ai33 \rightarrow \tilde{V}ai33 = Vai33 - Vai13 \cdot k\alpha$$

$$N14 = 0 = k\alpha \cdot Vai14 - Vai34 + \tilde{V}ai34 \rightarrow \tilde{V}ai34 = Vai34 - Vai14 \cdot k\alpha$$

$$N15 = 0 = k\alpha \cdot Vai15 - Vai35 \rightarrow k\alpha = Vai35/Vai15$$

$$N16 = 0 = k\alpha \cdot Vai16 - Vai36 \rightarrow k\alpha = Vai36/Vai16$$

$$N21 = 0 = k\lambda \cdot (Vai12 - \tilde{V}ai12) - Vai14 \rightarrow \tilde{V}ai12 = Vai12 - Vai14/k\lambda$$

$$N22 = 0 = k\lambda \cdot (Vai22 - \tilde{V}ai22) - Vai24 \rightarrow \tilde{V}ai22 = Vai22 - Vai24/k\lambda$$

$$N23 = 0 = k\lambda \cdot Vai23 - \tilde{V}ai34 + Vai34 \rightarrow \tilde{V}ai34 = Vai34 - Vai23 \cdot k\lambda$$

$$N24 = 0 = k\lambda \cdot Vai24 - \tilde{V}ai44 + Vai44 \rightarrow \tilde{V}ai44 = Vai44 - Vai24 \cdot k\lambda$$

-continued $$N25 = 0 = k\lambda \cdot Vai25 - Vai45 \rightarrow k\lambda = Vai45/Vai25$$

$$N26 = 0 = k\lambda \cdot Vai26 - Vai46 \rightarrow k\lambda = Vai46/Vai26$$

$$N31 = 0 = l\alpha \cdot Vai13 - Vai15 \rightarrow l\alpha = Vai15/Vai13$$

$$N32 = 0 = l\alpha \cdot Vai23 - Vai25 \rightarrow l\alpha = Vai25/Vai23$$

$$N33 = 0 = l\alpha \cdot (Vai33 - \widetilde{V}ai33) - Vai35 \rightarrow$$

$$\widetilde{V}ai33 = Vai33 - Vai35/l\alpha$$

$$N34 = 0 = l\alpha \cdot (Vai34 - \widetilde{V}ai34) - Vai45 \rightarrow$$

$$\widetilde{V}ai34 = Vai34 - Vai45/l\alpha$$

$$N35 = 0 = l\alpha \cdot Vai35 - \widetilde{V}ai55 + Vai55 \rightarrow$$

$$\widetilde{V}ai55 = Vai55 - Vai35 \cdot l\alpha$$

$$N36 = 0 = l\alpha \cdot Vai36 - \widetilde{V}ai56 + Vai56 \rightarrow$$

$$\widetilde{V}ai56 = Vai56 - Vai36 \cdot l\alpha$$

$$N41 = 0 = l\lambda \cdot Vai14 - Vai16 \rightarrow l\lambda = Vai16/Vai14$$

$$N42 = 0 = l\lambda \cdot Vai24 - Vai26 \rightarrow l\lambda = Vai26/Vai24$$

$$N43 = 0 = l\lambda \cdot (Vai34 - \widetilde{V}ai34) - Vai36 \rightarrow$$

$$\widetilde{V}ai34 = Vai34 - Vai36/l\lambda$$

$$N44 = 0 = l\lambda \cdot (Vai44 - \widetilde{V}ai44) - Vai46 \rightarrow$$

$$\widetilde{V}ai44 = Vai44 - Vai46/l\lambda$$

$$N45 = 0 = l\lambda \cdot Vai45 - \widetilde{V}ai56 + Vai56 \rightarrow$$

$$\widetilde{V}ai56 = Vai56 - Vai45 \cdot l\lambda$$

$$N46 = 0 = l\lambda \cdot Vai46 - \widetilde{V}ai66 + Vai66 \rightarrow$$

$$\widetilde{V}ai66 = Vai66 - Vai46 \cdot l\lambda$$

In this case the number of independent equations massively exceeds the number of unknowns so that the equations can be evaluated preferably using known methods like, for example, Gaussian regression or the total least squares method according to Pearson which is still better suited for this case but less known in the literature. Instead, there can also be controlled by randomly taken samples how well target deviation errors which are associated with different wavelengths of the target echo, are really uncorrelated. Therefor some of the corresponding elements of the target deviation error variance $\widetilde{V}ai$ are not set equal to zero but computed. This is particularly recommended in the event that the target deviation errors $\widetilde{a}i$ are temporally correlated.

Up to this point only the redundant angular target deviation signal vectors ai with respect to the i-th line of sight have been included in the sensor data correlation. However, not only the redundant angular target deviation signal vectors ai are dependent from each other but all of the signals generated by all target sensors and position sensors associated with all lines of sight because all of the target sensors track the same target. However, this dependency is more complicated and partially non-linear. Such dependency can be readily linearized, either locally by differentiation or globally by spatial transformation. When the sensor signals have different travel times there is also additionally required a temporal transformation. When the computation expanse or expense is not prohibitive, all of the sensor signals can be compared to each other by sensor data correlation and thereby the value of the computation result is remarkably increased. Such procedure is particularly recommended when the angular target deviation signals or vectors ai as such are non-redundant and/or when the range of the target, for instance, for reasons of camouflage is exclusively determined by triangulation instead of also by using active range sensors. For military use, it may be preferable for camouflage reasons to temporarily or intermittently interrupt the operation of the range sensors D1 and D2 if they are active, for example, by using switch means 30.

Also, pseudo sensor signals can be introduced into the sensor data correlation such as, for example, the apparent tracking error e as discussed further hereinbelow under the heading "System Inversion". Thus there can be compared and thereby standardized an uncertain response slope of target sensors with a reliable response slope of position or servo sensors. For this purpose, small tracking errors can be artificially generated, for example, via the control signal r generated by the regulator R. The artificially generated tracking errors have such a high frequency that the target estimator Ze can distinguish their effect when using an incorrect target sensor response slope from a true target movement. Such standardization is particularly valuable when the mirror or reflection effect is countered by means of "off-boresight-tracking" which, however, has the effect that the target deviation signal vectors or target deviation signals ai are no longer free of average values.

All of the aforementioned computations with respect to sensor data correlation are preferably carried out by means of the target estimator Ze. The results of such computations are utilized for optimizing the function of the target estimator Ze as well as for controlling the multipliers Mui via multiplier control signals zi.

VARIANCE Vai OF THE TARGET DEVIATION SIGNAL VECTOR ai

Up to this point it has been a precondition that the expectancy operator E represents an averaging operation over the ensemble of all of the model functions. In reality there is known only one model function which must be assumed to constitute an ergodic function so that the averaging operation can be carried out with respect to time instead of with respect to the ensemble of the model function. In order that the variance Vai of the measured target deviation signal vector ai may have as actual values as possible, the variance estimator Ve will be described hereinbelow as a further component of the target estimator Ze. By means of this variance estimator Ve the variance Vai of the target deviation signal vector ai can be estimated as precisely as possible within the shortest possible observation time period.

This variance estimator Ve preferably constitutes a Kalman-Bucy-Filter having state variables which are constituted by the elements Vaikl of the variance Vai of the target detection signal pector ai. The variation of these Riccati differential equation of the target tracking system, particularly the target estimator Ze and the servo estimator Se, taking due account of their coupling via the movement of the target and the multipliers Mui. This Riccati equation as such constitutes a deterministic equation for the deterministic variables Vaikl describing the properties of the stochastic target deviation signal vectors ai, see, for example, A. H. Jazwinski, "Stochastic Process and Filtering Theory"; Academic Press, 1970, Chapter 7.

In accordance with the invention, however, the elements Vaikl are no longer treated as deterministic variables but also as stochastic signals which are subject not only to deterministic but also stochastic i.e. random temporal variations. These stochastic or random variations are modelled in known manner in addition to the Riccati equation. There thus results a stochastic differential equation which leads to the variance estimator Ve via well known algebraic transformations and this operation is carried out according to the theory of the Kalman-Bucy-Filter, see, for example, the aforementioned textbook by A. H. Jazwinski. However, such variance estimator Ve is much more complicated than the target estimator Ze and the servo estimator Se and therefore should be simplified using the known methods of model reduction, see, for example, the publication by C. M. Liaw et al, entitled "Model Reduction of Discrete Systems Using the Power Decomposition Method and the System Identification Method"; I.E.E. Proceedings, January 1986, pages 30 to 34. If such simplification does not extend too far, the variance estimator Ve permits estimating the variance Vai of stochastic target deviation signal vectors ai which must be ergodic but do not have to be stationary.

The target deviation signal or vector ai is composed of two scalars aik and ail. The product aik.ail of the two scalars aik and ail serves as the observed or measured quantity of the state variable Vaikl of the variance estimator Ve. The observation or measurement error fkl of the observed or measured quantity aik.ail of the state variable Vaikl, is defined by the deviation of the observed or measured quantity aik.ail from the state variable Vaikl, $$fkl = aik.ail - Vaikl \tag{41}$$

The co-variance of the observation or measurement error fkl and a further observation or measurement error fmn is given by $$\begin{aligned} Vfklmn &= E[(aik \cdot ail - Vaikl) \cdot (aim \cdot ain - Vaimn)] \\ &= E[aik \cdot ail \cdot aim \cdot ain + Vaikl \cdot Vaimn - \\ &\quad aik \cdot ail \cdot Vaimn - aim \cdot ain \cdot Vaikl] \\ &= E[aik \cdot ail \cdot aim \cdot ain] - Vaikl \cdot Vaimn \\ &= Vaimk \cdot Vainl + Vaiml \cdot Vaink = Vfklmn, \end{aligned} \tag{42}$$

provided that the four scalars or target deviations aik, ail, aim and ain of the target deviation signal or signal vector ai have a Gaussian distribution and are free of average values because under such conditions their fourth moment is equal to:

$$E[aik.ail.aim.ain] = Vaikl.Vaimn + Vaimk.Vain + Vaiml.Vaink \tag{43}$$

It should be noted that the observation or measurement error fkl and the further observation or measurement error fmn do not have a Gaussian distribution.

The variance instead of the co-variance of the observation or measurement error fkl results from the special case k=m and l=n.

The variances in Equation (42) are unknown but required variances. The variance estimator Ve supplies estimates of such variances as well as the variance of the estimate errors of these estimates. Therefrom the precision in the determination of these unknown variances can be computed by partial differentiation of the unknowns in Equation (37) with respect to the elements of the variance Vai of the target deviation signal vector ai and by multiplication with the elements of Vf$^{\frac{1}{2}}$.

If it is not prohibitive to extremely simplify the variance estimator Ve, such variance estimator Ve may also be configured as a matrix $\alpha-\beta$-filter for each line of sight and such filter is governed by the relationship:

$$Vai_{(t+1)} = \alpha_F \cdot Vai_{(t)} + \beta_F \cdot ai.ai' \tag{44}$$

Therein $\alpha_F$ and $\beta_F$ represent scalar filter coefficients. In this Equation (44) the matrix $Vai_{(t+1)}$ constitutes the most recent estimate value for the variance Vai of the target deviation signal or vector ai at the moment of time t+1, wherein $Vai_{(t)}$ represents the preceding estimate at the moment of time t and ai represents the most recent target deviation signal or vector at the moment of time t+1. The scalar filter coefficients $\alpha_F$ and $\beta_F$ must be appropriately selected, for example, with reference to a less widely simplified variance estimator Ve. Preferably the filter coefficients $\alpha_F$ and $\beta_F$ obey the relationship:

$$\alpha_F + \beta_F = 1 \tag{45}$$

TARGET IDENTIFICATION

Radar instruments for sub-caliber anti-aircraft cannon or other so-called effectors of correspondingly low range have measuring errors which predominantly are caused by glitter or glint.

The point defined by the coordinates $$a = H^\$ \cdot (\hat{a}i + \tilde{a}i) = \hat{a} + H^\$ \cdot \tilde{a}i \tag{46}$$

in the coordinate system of the true target deviation signal vector â would constitute the center of instantaneous reflection of all radar waves when the measuring error $H^\$ \cdot \tilde{a}i$ which has been transformed by means of the Moore-Penrose-Pseudoinverse $H^\$$ of H, has the variance $$\tilde{V}a = E[H^\$ \cdot \tilde{a}i.\tilde{a}i' \cdot H^{\$'}] = H^\$ \cdot \tilde{V}ai.H^{\$'} \tag{47}$$

with the determinant det(Va) would be exclusively caused by glitter or glint. In the event that the centers of reflection have a Gaussian distribution, their distribution density pr obeys the relationship:

$$pr = \frac{\exp[-(a-\hat{a})' \cdot \tilde{V}a^{-1} \cdot (a-\hat{a})/2]}{2 \cdot \pi \cdot [det(\tilde{V}a)]^{\frac{1}{2}}} \tag{48}$$

Thus an ellipse defined by the equation $$(a-\hat{a})' \cdot \tilde{V}a^{-1} \cdot (a-\hat{a}) = 1 \tag{49}$$

surrounds a large portion of the target silhouette. This two-dimensional silhouette depends upon the three-dimensional shape of the target as well as upon its attitude which can be target.

Also with other target sensors, there can be rendered a conclusion with respect to the type of target from the two Eigen vectors of the transformed measurement error varience $\tilde{V}$a or from the Eigen vectors of the measuring error variance $\tilde{V}$ai. For example, a pilotless missile thus can be distinguished from a piloted bomber. However, it should be considered that the presently treated measuring errors or sensor errors primarily originate from angle sensors and that the angular dimension of the aforementioned targets is inversely proportional to their distance or range.

Missiles differ from bombers not only by their dimension but also by their flight behavior. If the target estimator Ze knows the measuring error variance $\overline{V}ai$ of the target sensors and the flight behavior of the target, the state of movement of the target can be more precisely estimated.

Also, the regulator R can more precisely maximize the tracking reliability of the servo system S when the regulator R knows the dimension of the target as far as this target generates the echo signals which are received by the target sensors.

Finally, the inventive tracking system when used for target engagement, may contain at least one component servo which is associated with a group of sensors containing transmitters having the same antenna direction and the same signal travel time from the transmitter to the target. Such component servo is associated with an effector for causing the firing direction of such effector to track the location at which the projectiles fired by the effector reach the target. The firing direction of the effector is substantially equal to the aforementioned antenna direction required for a transmitter generating transmitted target sensor signals which propogate essentially in the same manner as the projectiles fired by the effector. Such target engaging system can be utilized in a tactically more reasonable manner if the vulnerable dimension of the target and thus the hitting probability of the projectile is known.

SYSTEM INVERSION

The output signal of the system to be inverted and described further hereinabove in the section entitled "Regulator R" with reference to FIG. 2b of the drawings, constitutes the apparent tracking error e. The apparent tracking error e constitutes a vector and contains estimates of the true target deviation signal vector â or the true tracking error vector ê as given in Equations (1) and (2) for all lines of sight and at least one temporal moment of validity. Such estimates constitute positional differences and are a function of the estimates ez of the state of movement of the target and the estimates es of the states of movement of the servo system S. The respective estimates ez and es of the states of movement of the target and the servo system S, like also the control signals or signal vectors mi do not form input signals to the system to be inverted but constitute internal couplings. Such internal couplings are disturbed by measuring errors as well as unexpected movements of the target and of the platform. Expected movements of the target and of the platform are generated by the system to be inverted.

The input or input signal of the system to be inverted is composed of the vectorial regulation signal or control signal vector r which is computed by the regulator R for at least one temporal moment of validity such that the output or output signal of the system to be inverted, i.e. the apparent tracking error e is equal to zero in the absence of any disturbances. Thus, in accordance with FIG. 2b, the regulator R can be considered as an inverse system having a zero input signal.

The system to be inverted may now be represented by the difference Equations (51) and (52):

$$xn = ft(xa) + Gr \cdot r \qquad (51)$$

$$e = He \cdot x \text{ bzw. } ea = He \cdot xa \text{ bzw. } en = He \cdot xn \qquad (52)$$

Therein, x represents a state vector x which is composed of the state vector associated with the target movement, the state vector associated with the target estimator Ze, the state vector associated with the movement of the servo system S and the state vector associated with the servo estimator Se. xa constitutes a preceding value of the state vector x at the moment of time t. In these equations the modelling errors associated with the target estimator Ze and with the servo estimator Se preferably are neglected so that the respective state vectors always are substantially equal to the state vectors respectively associated with the target movement and the servo system movement.

The vector xn constitutes the most recent value of the state vector x at the moment of time t+1, i.e. at the moment of time following the moment of time t by one clock cycle. The vectorial transition function ft (xa) is assumed to be non-linear because the target and particularly the servo system S are composed of bodies which are subject not only to translatory but also rotary movement. In contrast thereto, the effect of the input signal or control signal vector r upon the state vector x and the effect of the state vector x upon the output or output signal which constitutes the apparent tracking error e, are assumed to be linear which is indicated by the matrices Gr and He. This condition is satisfied at least during stationary target tracking because in such event the input or control signal or vector r and particularly the output signal which constitutes the apparent tracking error e, are small due to the preceding operation of the multipliers Mui.

From Equations (51) and (52) there follows:

$$\begin{aligned} en &= He \cdot xn = He \cdot (ft(xa) + Gr \cdot r) \\ &= He \cdot ft(xa) + He \cdot Gr \cdot r \end{aligned} \qquad (53)$$

$$r = (He \cdot Gr)^\$ \cdot [en - He \cdot ft(xa)] \qquad (54)$$

Therein $(He \cdot Gr)^\$$ is assumed to constitute the inverse $(He \cdot Gr)^{-1}$ of the matrix $He \cdot Gr$ provided that this matrix is invertible, i.e. a square matrix of full-rank character. The output or output signal of the system to be inverted, then, is exactly equal to the apparent tracking error e provided that the input or control signal vector r is computed in accordance with Equation (54) and there do not occur any disturbances. Thus for en=o the Equation (54) constitutes an equation describing the regulator R. From this equation, He could be eliminated when Gr would be invertible which, however, hardly ever is true.

It should be noted that the transition function ft(xa) need not be inverted. However, the regulator R utilizes the state vector xa which, for example, originates from a specific model of the system to be inverted or, preferably, from the target estimator Ze and the servo estimator Se.

In the event that the matrix $He \cdot Gr$ constitutes a non-invertible matrix, $(He \cdot Gr)^\$$ should be selected as a suitable pseudoinverse which produces a reasonably weighted mean of the variances of the elements of the apparent tracking error vector e and/or minimizes the input or control signal vector r, while taking into account disturbances, for example, with reference to Equations (66) and (69) as given further hereinbelow.

In the event that the target tracking constitutes a non-stationary operation, for example, during heavy manouvers or shortly after target detection, the input or control or adjusting signals vectors r according to Equation (54) possibly become greater than their permissible values. In such case there should be utilized instead of the Equations (51) and (52) the more general formula $$e = fg(r) \tag{55}$$

Therein the apparent tracking error e preferably encompasses a future time period of validity which is longer than a decaying impulse response of the system to be inverted. The input or control or adjusting signal or vector r is composed of two component vectors rb and ru and preferably encompasses the same time period of validity and as many time moments of validity such that the component vector ru contains less elements than the apparent tracking error e in order that there may not be possible any hidden oscillations between the temporal moments of validity associated with the apparent tracking error e.

The control signal r can be considered as a timetable for the movement of the system to be inverted. This movement starts at the initial values of the states ez and es; and it can be calculated by integration of the differential equations of the system to be inverted. The result of this computation is the apparent tracking error e as a function of the timetable r. Inversely there can also be computed from a given apparent tracking error e the therefor required input or control or adjusting signal vectors r by iterative Newton inversion of the non-linear vector function fg. This is particularly also true in the event that the apparent tracking error e is equal to zero.

At the start of such procedure the number of elements of the known component vector rb is equal to zero. When one element of the unknown component vector ru exceeds the respective permissible value after a step of the iteration, such element is set equal to the thus defined limiting value. Simultaneously such element is converted from an element of the unknown component vector ru, which is to be computed in accordance with the aforementioned iterative Newton inversion, to an element of the known component vector rb. If required, the number of temporal moments of validity associated with the unknown component vector ru is also increased and the validity range of the apparent tracking error e is correspondingly displaced towards the future.

In favorable cases, such iteration converges towards a timetable of the input or control signal vectors r and which timetable is optimized with respect to time. The component vector rb of the time-optimized timetable contains the limiting values and the component vector ru of such time-optimized timetable contains only permissible values; the temporal moments of validity of the component vectors rb and ru are widely mixed. The timetable of the input or control signal vector r is utilized for controlling the controllable rotational axes of the servo system S and the servo estimator Se only until the appearance of further sensor signals, namely angle sensor signals a, range sensor signals d or position sensor signals c, because, then, the input or control signal vector or control signal, r is redetermined.

When the target tracking operation gradually becomes stationary, the elements of the unknown component vector ru tend to assume limiting values which are opposite to the values of timewise adjacent elements of the known component vector rb and, therefore, such timewise adjacent elements can be cancelled. When their number has decreased to zero, the input or control signal vector r preferably is recomputed under the assumption of r=ru as follows:

A first order Taylor series development of Equation (55) about the operating point $$eo = fg(ro) \tag{56}$$

leads to $$e = eo + el = fg(ro + rl)fg(ro) + \left.\frac{\partial fg}{\partial r}\right|_{r=ro} \cdot rl = eo + F \cdot rl \tag{57}$$

Therein, eo represents the apparent tracking error at rl=0, rl represents a small deviation from the operating point r=ro and such deviation is defined as r−ro. Preferably, ro is equal to zero for an approximately linear system.

Equation (57) thus determines the matrix F of the linear dependency of the apparent tracking error vector e upon the input or control signal vector r as a partial derivative of fg with respect to r at r=ro. This is a well known part of the algorithm of the aforementioned Newton iteration which results in an approximate determination of the matrix F and the calculation of $$rl = (F'.F)^{-1}.'.el \tag{58}$$

in the event that the matrix F constitutes a full-rank matrix and that the apparent tracking error e or el encompasses more elements than the input or control signal or vector r or rl. If, however, the matrix F constitutes a square matrix, then, Equation (58) becomes:

$$rl = F^{-1}.el = F^{-1}.(e-eo) \tag{59}$$

The apparent tracking error e constitutes an estimate of the true tracking error ê having an estimate error $$\tilde{e} = e - \hat{e} \tag{60}$$

which is caused by disturbances like, for example, measuring errors as well as unexpected movements of the target and the platform. The various $\tilde{V}$ of the estimate error $\tilde{e}$ associated with the apparent target tracking error e is given by $$\tilde{V} = E[\tilde{e}.\tilde{e}'] \tag{61}$$

and can be computed by integrating the corresponding matrix Riccati differential equation of the system to be inverted. Such computation starts from the variances $\tilde{V}z$ and $\tilde{V}s$ of the respective estimate errors ez and es and of the respective estimates $\tilde{e}z$ and $\tilde{e}s$ of the states of movement of the target and the servo system S. Such variances $\tilde{V}z$ and $\tilde{V}s$ are supplied by the target estimator Ze and the servo estimator Se as by-products in the event that such target estimator Ze and servo estimator Se are constructed as the aforementioned Extended Kalman-Bucy-Filters.

When the estimate error $\tilde{e}$ is average-free and possesses a Gaussian distribution, then, the probability pe of the true tracking error ê being located intermediate the true tracking error ê and ê+dê is given by the relationship $$pe = exp[-(e-e)'.\tilde{V}^{-1}.(\hat{e}-e)/2].[[(2.\pi)^{n}.det(\tilde{V})]^{-\frac{1}{2}}.d\hat{e} \tag{62}$$

provided that dê is infinitely small and the true tracking error ê exactly contains n elements. Therein det $(\tilde{V})$ represents the determinant of the variance matrix V of the estimate error $\tilde{e}$ as defined by Equation (60).

The probability that the true tracking error ê, also with respect to a sensor having the narrowest measuring range for each line of sight, does not result in the loss of a measured value, may be assumed as $$Ps = exp(-\hat{e}'.A^{-1}.\hat{e}/2) \qquad (63)$$

Therein the positively definite and preferably symmetric matrix A represents a measure for the angular dimensions of the target and the measuring range as well as their relative position with respect to the range and the aspect angle as well as the distribution of the aspect angle and its velocity. The aspect angle is defined as the angle between the line of sight and the target. Indications of the dimension of the target result from the variance $\tilde{V}ai$ of the target deviation errors $\tilde{a}i$, see the discussion in the section entitled "Target Identification".

Thus the probability P that, even by use of the sensor having the narrowest measuring range for each line of sight, no true tracking error $\tilde{e}$ results in the loss of a measuring value, becomes:

$$P = \int_\infty Ps \cdot pe = [det(A)/det(A + \tilde{V})]^{\frac{1}{2}} \cdot \qquad (64)$$
$$exp[-e' \cdot (A + \tilde{V})^{-1} \cdot e/2]$$

In the event of constant or fixed matrices A and V, the apparent tracking error e becomes small and the probability P is maximized when the square $$Q = e'.(A+\tilde{V})^{-1}.e = (F.rl + eo)'.(A+\tilde{V})^{-1}.(F.rl + eo) \qquad (65)$$

becomes a minimum, i.e. when $$rl = -[F.(A+\tilde{V})^{-1}.F]^{-1}.F.(i\,A+\tilde{V})^{-1}.eo \qquad (66)$$

The load on the servo system S due to its control under the action of the input or control signal vector rl can be accounted for if Q of Equation (65) is extended to $$Q = e'.(A+\tilde{V})^{-1}.e + b'.C.b \qquad (67)$$

Therein the load b, similar to the apparent tracking error e, is assumed to be a linear function of the linear component rl of the input or control signal or vector r, namely:

$$b = B.rl + bo \qquad (68)$$

The weighting matrix C preferably is understood and predetermined as the variance matrix of a particularly undesired type of load b, for example, because such undesired type of load b excites structural resonances or tends towards limiting values. The weighting matrix C preferably may also be understood and predetermined as the inverse of a variance matrix of a particularly harmless type or as a mixture of the aforementioned variance matrices. Thus Q is minimized if:

$$rl = -[.F.(A+\tilde{B}'.C.B]^{-1}.[F.\,(A+\tilde{V})^{-1}.eo + B'.C.bo] \qquad (69)$$

This equation describes, for stationary target tracking, the most reasonable manner of maintaining small the true tracking errors ê and the load b on the servo system S, although under these conditions the system is not exactly inverted. The corresponding maximum tracking reliability can be computed from Equations (69), (57) and (64) and the servo load can be computed from Equation (68).

RESIDUES AND MEMO

The computation of the variance $\tilde{V}$ of the estimate error $\tilde{e}$ associated with the apparent tracking error e according to Equation (61) opens up a further possibility of intercepting sensor disturbances, in addition to the robust matrix as discussed further hereinabove in the corresponding entitled section. Therefore it is assumed that the apparent tracking error e only encompasses the instant temporal moment of validity. Then, in accordance with Equations (1), (2) and (60), the measuring error is $$\tilde{a}i = ai - ai = ai - H.a = ai - H.e = ai - H.(e - \tilde{e}) -$$
$$= ai - H.e + H.\tilde{e} \qquad (70)$$

The residuum ri of the measurement of the target deviation signal or vector ai can be computed as $$ri = ai - H.e = \tilde{a}i - H.\tilde{e} \qquad (71)$$

and, in accordance with equation (71) has the variance:

$$Vri = E[ri.ri'] = \tilde{V}ai + H.\tilde{V}.H' \qquad (72)$$

provided the estimate error $\tilde{e}$ the apparent target tracking error e is not correlated with the measuring error ai of the measured target tracking signal vector âi. This is true in the event that the measuring errors $\tilde{a}i$ are not temporally correlated.

If the residuum ri is average-free and has a Gaussian distribution, the square $rij^2$ of its j-th element rij is smaller than 9.Vrijj at a probability of 99.73%, wherein Vrijj represents the corresponding diagonal element of the variance Vri of the residuum ri, provided that there do not occur any unexpected sensor disturbances.

If this condition is not satisfied or if rij is too great or if, for any other reason, the corresponding element aij of the measured target deviation signal vector ai fails to occur or does not appear reliable, in accordance with the invention the element rij is replaced with zero and consecutively the measured target deviation signal vector ai with ri+H.e, at least for processing the measured target deviation signal vector ai by means of the target estimator Ze. In the event that such replacement takes too much time for the multiplier Mui, the j-th column of the matrix Mai simply is set equal to zero. Such memo-type operation, i.e. tracking the target on the basis of the preceding measurements stored in the memory in the form of the apparent target tracking error e, is reasonable because ri according to Equation (71) is composed of the known magnitudes ai and e which are known from normal operation, and also of their average-free errors $\tilde{a}i$ and $\tilde{e}$. It should be noted in this respect that the optimum estimate for an average-free number is zero if otherwise nothing is known about such number.

The aforementioned method which has been described hereinbefore with respect to the example of a target sensor signal, can also be utilized with respect to the position sensor signals for the target estimator Ze.

MONITORING DEVICE U

Prior to the start of a target tracking operation the target must arrive at the measuring range of at least one target tracking sensor. If a plural number of targets is present within the range of the inventive target tracking system, the most important, for example, the most threatening of the plural number of targets must be recognized and selected for the tracking operation.

For this purpose, the monitoring device U monitors the entire space within which targets may appear and periodically scans this space by means of search sensors. In most cases, such search sensors presently comprise search radar instruments, i.e. active search sensors. In military applications there will be utilized in the future to a greater extent passive search sensors for purposes of camouflage. Such passive search sensors, may comprise, for example, heat image cameras or acoustic sensors.

When the monitoring device U has detected and selected a target, the monitoring device U generates a direction or instruction signal u for controlling the servo system S and identically the servo estimator Se such that the target appears within the measuring range of the target tracking sensors. Already prior thereto the servo estimator Se continuously has observed the servo system S and determined the estimate es of the state of movement of the servo system S. The monitoring device U can utilize this estimate es in a manner similar to the regulator R in order to particularly rapidly and precisely move the servo system S. Likewise, the monitoring device U can utilize the position sensor signals c in the event that the servo estimator Se is not or not yet ready or produces an imprecise or still imprecise estimate es. Preferably the direction or instruction signal u is computed similar to the input or control signal vector r by system inversion and is superimposed upon such input or control signal vector r by means of summing stages.

While there are shown and described present preferred embodiments of the invention, it is to be distinctly understood that the invention is not limited thereto, but may be otherwise variously embodied and practiced within the scope of the following claims.
ACCORDINGLY,
What I claim is:

1. A target tracking system comprising:
   at least one angle sensor;
   said at least one angle sensor containing at least one antenna defining at least one line of sight;
   said at least one angle sensor measuring angular deviations of a target from said at least one line of sight;
   at least one range sensor for measuring the distance between said target and said at least one range sensor;
   said at least one range sensor containing at least one antenna;
   each one of said at least one angle sensor and said at least one range sensor defining at least one transmission range and at least one reception range;
   a servo system operatively associated with said at least one angle sensor and said at least one range sensor;
   said servo system continuously laying said at least one antenna of said at least one angle sensor and said at least one antenna of said at least one range sensor towards said target such that said target is continually present within said at least one transmission range and said at least one reception range of said at least one antenna;
   means for generating a position sensor signal;
   a servo estimator for estimating the state of movement of said servo system by means of said position sensor signal;
   said servo estimator constituting a model of said servo system;
   said at least one angle sensor and said at least one range sensor generating respective target sensor signals;
   a target estimator operatively associated with said at least one angle sensor, said at least one range sensor and said position sensor signal generating means;
   said target estimator estimating the state of movement of said target on the basis of said position sensor signal and all of said target sensor signals;
   said target estimator constituting a model of the movement of said target;
   a regulator for identically controlling said servo system and said servo estimator by means of a common control signal;
   said regulator constituting an inverse system with respect to the residual portion of the target tracking system;
   said at least one angle sensor generating at least one target deviation signal;
   at least one multiplier operatively associated with said at least one angle sensor;
   said at least one multiplier transforming with minimum delay said at least one target deviation signal originating from said at least one angle sensor into at least one common control signal for said servo system and said servo estimator;
   said at least one multiplier defining at least one multiplier matrix; and
   said at least one multiplier generating as said common control signal, at least one control vector constituting the product of said at least one multiplier matrix and said at least one target deviation signal.

2. The target tracking system as defined in claim 1, wherein:
   said at least one angle sensor and said at least one range sensor respectively constitutes a predetermined number of angle sensors and a predetermined number of range sensors;
   said predetermined number of angle sensors and said predetermined number of range sensors respectively and selectively constituting any one of (i) a predetermined number of transmitters for transmitting target tracking signals, (ii) a predetermined number of receivers for receiving target tracking signals or (iii) both said predetermined number of transmitters and receivers;
   a number of groups of a first kind of said predetermined number of transmitters encompassing transmitters having substantially the same antenna direction and substantially the same target tracking signal travel time from said transmitters to said target;
   a number of groups of a second kind of said predetermined number of receivers encompassing receivers having substantially the same antenna direction and substantially the same target tracking signal travel time from said target to said receivers;
   where each of said numbers of groups can be equal to or greater than zero;

a group of a third kind of said predetermined number of transmitters and said predetermined number of receivers encompassing transmitters and receivers having substantially the same antenna direction, negligible entire target tracking signal travel times and mutual spatial distances within a predetermined value of such mutual spatial distances;

said servo system comprising a predetermined number of component servos;

each said component servo defining at least two rotational axes;

each said component servo being selectively controlled for rotation about said at least two rotational axes for a respective one of each said number of groups of said first kind, said number of groups of said second kind and said group of said third kind having said substantially same antenna directions to track a location at which said transmitted target tracking signals arrive at the target or from which said received target tracking signals are emitted by said target; and each one of said groups of said first kind, said second kind and said third kind can be viewed as a single sensor during said target tracking operation.

3. The target tracking system as defined in claim 1, further including:

a monitoring device;

said monitoring device monitoring a predetermined total space for the appearance of a predetermined number of said targets;

said monitoring device being operatively connected to said servo system and said servo estimator; and said monitoring device identically directing said servo system and said servo estimator to a preselected one of said predetermined number of targets.

4. The target tracking system as defined in claim 3, wherein:

said servo estimator generates an estimate of said state of movement of said servo system;

said monitoring device selectively receiving any one of (i) said position sensor signal, (ii) said estimate of said state of movement of said servo system from said servo estimator or (iii) both said position sensor signal and said estimate in order to thereby improve said directing operation on said servo system and said servo estimator.

5. The target tracking system as defined in claim 2, wherein:

said number of groups of said first kind of said predetermined number of transmitters encompasses a transmitter constituting an effector for firing projectiles;

said predetermined number of component servos containing at least one component servo operatively associated with said group of said first kind encompassing said effector;

said effector defining a firing direction substantially equal to said antenna direction which would be required for said transmitter to transmit target tracking signals which propagate substantially in the same manner as said projectiles fired by said effector.

6. The target tracking system as defined in claim 1, wherein:

said target estimator contains a variance estimator;

said at least one angle sensor generating angular target deviation signals; and said variance estimator determining and evaluating the variances of all of said angular target deviation signals and, during this operation, accounting for the mutual linear dependency of the components of the angular target deviation signals and thereby determining the variance of the errors of all of said angular target deviation signals generated by said at least one angle sensor.

7. The target tracking system as defined in claim 6, wherein:

said target estimator evaluates said variance of said errors of said angular target deviation signals for determining the spatial dimensions of said target; and said spatial dimensions of said target permitting the determination of the type, the moving characteristics and the vulnerability of said target.

8. The target tracking system as defined in claim 6, wherein:

said angular target deviation signal generated by said at least one angle sensor constitutes a target deviation vector;

said at least one control vector, which is generated by said predetermined number of multipliers, constituting an estimate of a preselected control vector;

said preselected control vector constituting the transform of a target deviation vector generated by an imaginary error-free angle sensor;

said estimate of said preselected control vector being afflicted by estimate errors having a predetermined variance; and said predetermined variance of said estimate errors of said estimate of said preselected control vector being minimized in view of said variance of said target deviation signals and said variance of said errors of said target deviation signals.

9. The target tracking system as defined in claim 7, wherein:

said target estimator accounts for at least said variance of said errors of said target deviation signals and said moving characteristics of said target; and said regulator accounting for at least said spatial dimensions of said target such that there is a maximum probability for a sufficiently large portion of said target to be continually present within said at least one transmission range and said at least one reception range defined by said at least one angle sensor and said at least one range sensor.

10. The target tracking system as defined in claim 6, wherein:

said at least one target deviation signal generated by said at least one angle sensor constituting at least one target deviation vector;

said at least one angle sensor and said at least one range sensor selectively constituting any one of (i) at least one transmitter for transmitting target tracking signals, (ii) at least one receiver for receiving target tracking signals having a predetermined wavelength or (iii) both said at least one transmitter and at least one receiver;

said at least one angle sensor causing substantially simultaneously disappearance of all those components of said at least one target deviation vector which components are determined by received target tracking signals having substantially the same predetermined wavelength as long as no sufficiently strong target tracking signal can be received at said predetermined wavelength;

said servo system comprising a predetermined number of component servos;

each said component servo defining at least two rotational axes;

each said component servo being controlled for rotation about said at least two rotational axes during a tracking operation;

said at least one multiplier defining as said at least one multiplier matrix, at least one multiplier matrix which is optimized in terms of variance and which is composed of elements assuming only two different values in the event that said at least one angle sensor constitutes a group of only error-free angle sensors, one of said only two different values being substantially equal to zero with the result that the associated matrix element of said at least one multiplier matrix does not mediate a coupling between an associated one of said at least two rotational axes of the respective component servo and the associated component of said at least one target deviation vector;

said at least one target deviation vector being composed of a predetermined number of components;

at least one real matrix composed of zero elements with the exception, in each row, of one element which is equal to 1 and associated with a respective one of said at least two rotational axes of said component servo, each said matrix element equal to 1 being related to an absolutely smallest vector component of all vector components coupled to said respective rotational axis with the exception of those vector components which are caused to substantially simultaneously disappear together with all other vector components associated with said received target tracking signals having substantially the same wavelength.

11. The target tracking system as defined in claim 1, further including:

switch means;

said at least one range sensor for measuring said distance between said target and said at least one range sensor, being operatively connected to said switch means in order to switch-off said at least one range sensor for camouflage purposes;

said at least one angle sensor constituting at least two angle sensors; and said at least two angle sensors being spatially distant from each other such that the respective target ranges can be determined by triangulation.

12. The target tracking system as defined in claim 1, wherein:

said at least one range sensor constitutes at least one passive range sensor;

said at least one angle sensor constituting at least two angle sensors; and said at least two angle sensors being spatially distant from each other such that the respective target ranges can be determined by triangulation.

13. The target tracking system as defined in claim 1, wherein:

said at least one target sensor signal generated by said at least one angle sensor is composed of a predetermined number of target sensor signal components;

each one of said target sensor signal components defining a residuum;

each one of said predetermined number of target sensor signal components possessing a predetermined reliability which is determined by at least comparing the residuum of said at least one target sensor signal component and the variance of such residuum;

a non-reliable target sensor signal component of said predetermined number of target signal components defining a residuum which is replaced by zero at least with respect to said target estimator;

said at least one multiplier defining as said at least one multiplier matrix, at least one multiplier matrix containing a predetermined number of columns; and a respective one of said predetermined number of columns containing elements which corresponds to said non-reliable target sensor signal component and, define said non-disappearing residuum, with all of such elements being set equal to zero.

14. A target tracking system comprising:

at least two angle sensors;

said at least two angle sensors each containing at least one respective antenna defining at least one respective line of sight;

said at least two angle sensors being sufficiently spatially separated from one another to determine distance to a target by triangulation and measuring angular deviations of the target from said respective lines of sight;

each one of said at least two angle sensors defining at least one respective transmission range and at least one respective reception range;

a servo system operatively associated with said at least two angle sensors;

said servo system continuously laying said antennae of said at least two angle sensors towards said target such that said target is continually present within said at least one respective transmission range and said at least one respective reception range of said at least two antennae;

means for generating a position sensor signal;

a servo estimator for estimating the state of movement of said servo system by means of said position sensor signal;

said servo estimator constituting a model of said servo system;

said at least two angle sensors each generating respective target sensor signals;

a target estimator operatively associated with said at least two angle sensors and said position sensor signal generating means;

said target estimator estimating the state of movement of said target on the basis of said position sensor signal and all of said target sensor signals;

said target estimator constituting a model of the movement of said target;

a regulator for identically controlling said servo system and said servo estimator by means of a common control signal;

said regulator constituting an inverse system with respect to the residual portion of the target tracking system;

said at least two angle sensors generating at least two target deviation signals;

at least one respective multiplier operatively associated with each said at least two angle sensors;

each said at least two multipliers transforming with minimum delay said at least two target deviation signals originating from said at least two angle sensors into at least two common control signals for said servo system and said servo estimator;

said at least two multipliers each defining at least one respective multiplier matrix; and said at least two multipliers generating as said common control signals at least two control vectors, each of said control vectors constituting the respective product of said respective multiplier matrix and said respective target deviation signal.

* * * * *

UNITED STATES PATENT AND TRADEMARK OFFICE
CERTIFICATE OF CORRECTION

PATENT NO. : 4,760,397

DATED : JULY 26, 1988

INVENTOR(S) : HEINZ PICCOLRUAZ

It is certified that error appears in the above-identified patent and that said Letters Patent is hereby corrected as shown below:

Column 10, please rewrite Equation 3 as follows: $\hat{a} = H^\$ \cdot \hat{a}i = (H' \cdot H)^{-1} \cdot H' \cdot \hat{a}i$ Column 11, line 19, after "error" insert --$\hat{a}i$--

Column 11, line 21, after "error" insert --$\hat{a}i$--

Column 11, line 26, please delete "$\hat{a}i'$" and insert --$ai'$--

Column 11, line 30, please rewrite Equation 7 as follows:

$E(\hat{a}i \cdot ai') = E[J \cdot ai \cdot ai' - \hat{a}i \cdot ai']$
$\qquad\qquad = E[J \cdot ai \cdot ai' - \hat{a}i \cdot \hat{a}i' - \hat{a}i \cdot \tilde{a}i']$ Column 11, line 39, after "error" delete "$\hat{a}i$" and insert --$\tilde{a}i$--

Column 11, line 53, after "value" delete "$\hat{a}i$" and insert --$\overline{ai}$--

Column 11, line 53, after "," (comma) insert --$\nabla ai$--

Column 12, line 67, rewrite Equation 15 as follows: $mi = \overline{ei} = L^\$ \cdot \overline{a} = L^\$ \cdot H^\$ \cdot J \cdot ai$ Column 13, line 15, after "error" please insert --$\tilde{a}i$--

Column 13, line 29, after "variance" please insert --$\nabla ai$--

Column 15, line 42, after "ERROR" please delete "$\hat{a}i$" and insert --$\tilde{a}i$--

Column 15, line 56, please rewrite Equation 32 as follows:
$\qquad G \cdot \hat{a}i = G \cdot H \cdot \hat{a} = 0 \qquad\qquad (32)$ Column 15, line 61, please delete "p"

Column 16, line 19, after "and" (second occurrence) please insert --$\tilde{a}i$--

Column 16, please rewrite Equation 37 as follows: $G \cdot (Vai - \tilde{V}ai) = 0$ Column 16, line 33, after "value" please delete "$\hat{a}i$" and insert --$\overline{ai}$--

Column 17, line 23, after "side" please delete "$\tilde{a}$" and insert --$\overline{a}$--

UNITED STATES PATENT AND TRADEMARK OFFICE
CERTIFICATE OF CORRECTION

PATENT NO. : 4,760,397
DATED : JULY 26, 1988
INVENTOR(S) : HEINZ PICCOLRUAZ

It is certified that error appears in the above-identified patent and that said Letters Patent is hereby corrected as shown below:

Column 17, line 26, please delete "error" and insert --errors $\tilde{a}i$--

Column 17, line 27, please delete "$\tilde{a}i$" and insert --ai--

Column 18, line 5, after "variance" please delete "Vai" and insert --$\tilde{V}ai$--

Column 18, line 63, please delete "$\tilde{V}ai34 + Vai34$" and insert --$Vai34 + \tilde{V}ai34$--

Column 18, line 66, please delete "$\tilde{V}ai34 + Vai34$" and insert --$Vai34 + \tilde{V}ai34$--

Column 19, line 15, please delete "$\tilde{V}ai55 + Vai55$" and insert --$Vai55 + \tilde{V}ai55$--

Column 19, line 20, please delete "$\tilde{V}ai56 + Vai56$" and insert --$Vai56 + \tilde{V}ai56$--

Column 19, line 33, please delete "$\tilde{V}ai56 + Vai56$" and insert --$Vai56 + \tilde{V}ai56$--

Column 19, line 35, please delete "$\tilde{V}ai66 + Vai66$" and insert --$Vai66 + \tilde{V}ai66$--

Column 20, line 58, please delete "pector" and insert --vector--

Column 20, line 59, after "these" please insert --elements with respect to time will be described by the matrix--

Column 21, line 6, after "are" please delete "modelIed" and insert --modelled--

Column 21, line 54, please delete "Vain" and insert --Vainl--

Column 22, line 29, after "errors" please insert --$\tilde{a}i$--

Column 22, line 43, after "det" please delete "(Va)" and insert --$(\tilde{Va})$--

Column 22, line 59, after "be" please insert --computed from the estimate ez of the state of movement of the--

Column 26, line 27, please rewrite Equation 58 as follows: $r\ell = (F'.F)^{-1}.F'.e\ell$ Column 26, line 53, after "errors" please delete "ez and es" and insert --$\tilde{e}z$ and $\tilde{e}s$--

UNITED STATES PATENT AND TRADEMARK OFFICE
CERTIFICATE OF CORRECTION

PATENT NO. : 4,760,397
DATED : JULY 26, 1988
INVENTOR(S) : HEINZ PICCOLRUAZ

It is certified that error appears in the above-identified patent and that said Letters Patent is hereby corrected as shown below:

Column 26, line 54, please delete "and" (first occurrence)

Column 26, line 54, after "estimates" please delete "$\tilde{e}z$ and $\tilde{e}s$" and insert --ez and es--

Column 26, please rewrite Equation 62 as follows:

$$pe = \exp[-(e-e)' \cdot \tilde{V}^{-1} \cdot (\hat{e}-e)/2] \cdot [(2.\pi)^n \cdot \det(\tilde{V})]^{-1/2} \cdot d\hat{e}$$

Column 27, line 3, after "matrix" please delete "V" and insert --$\tilde{V}$--

Column 27, line 33, after "and" please delete "V" and insert --$\tilde{V}$--

Column 27, line 41, please rewrite Equation 66 as follows:

$$r\ell = - [F' \cdot (A+\tilde{V})^{-1} \cdot F]^{-1} \cdot F' \cdot (A+\tilde{V})^{-1} \cdot eo$$

Column 27, line 65, please rewrite Equation 69 as follows:

$$r\ell = - [F' \cdot (A+\tilde{V})^{-1} \cdot F + B' \cdot C \cdot B]^{-1} \cdot [F' \cdot (A+\tilde{V})^{-1} \cdot eo + B' \cdot C \cdot bo]$$

Column 28, please rewrite Equation 70 as follows:

$$\tilde{a}i = ai - \hat{a}i = ai - H \cdot \hat{a} = ai - H \cdot \hat{e} = ai - H \cdot (e-\tilde{e}) = ai - H \cdot e + H \cdot \tilde{e}$$

Column 28, line 33, after "$\tilde{e}$" please insert --of--

Column 28, line 34, after "error" please delete "ai" and insert --$\tilde{a}i$--

Column 28, line 35, after "vector" please delete "âi" and insert --ai--

Column 31, line 57, after "effector;" insert --and--

Column 33, line 23, after "components;" insert --and--

Signed and Sealed this

Seventh Day of March, 1989

Attest:

DONALD J. QUIGG

*Attesting Officer*    *Commissioner of Patents and Trademarks*